United States Patent
Ukita et al.

(10) Patent No.: US 9,444,575 B2
(45) Date of Patent: Sep. 13, 2016

(54) WIRELESS COMMUNICATION SYSTEM, RECEIVER, TRANSMITTER, AND TRANSMISSION RATE CONTROL METHOD

(71) Applicant: Panasonic Intellectual Property Management Co., Ltd., Osaka (JP)

(72) Inventors: Yosuke Ukita, Osaka (JP); Naotake Yamamoto, Osaka (JP); Takaaki Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 195 days.

(21) Appl. No.: 14/526,512

(22) Filed: Oct. 29, 2014

(65) Prior Publication Data

US 2015/0124635 A1 May 7, 2015

(30) Foreign Application Priority Data

Nov. 5, 2013 (JP) .................................. 2013-229241

(51) Int. Cl.
*H04L 1/00* (2006.01)
*H04W 24/08* (2009.01)

(52) U.S. Cl.
CPC ........... *H04L 1/0002* (2013.01); *H04L 1/0003* (2013.01); *H04L 1/0009* (2013.01); *H04L 1/0025* (2013.01); *H04L 1/0034* (2013.01)

(58) Field of Classification Search
CPC . H04L 1/0002; H04L 1/0034; H04L 1/0003; H04L 1/0009; H04W 24/08
See application file for complete search history.

(56) References Cited

U.S. PATENT DOCUMENTS

| 2011/0039507 A1* | 2/2011 | Sato ..................... H04L 1/0002 455/226.2 |
| 2012/0140839 A1* | 6/2012 | Yoshikawa .......... H04B 1/1027 375/285 |
| 2014/0105058 A1* | 4/2014 | Hu ........................ H04W 24/08 370/253 |

FOREIGN PATENT DOCUMENTS

| JP | 9-093155 | 4/1997 |
| JP | 2001-103041 | 4/2001 |

* cited by examiner

*Primary Examiner* — Charles C Jiang
*Assistant Examiner* — Thad Defauw
(74) *Attorney, Agent, or Firm* — Greenblum & Bernstein, P.L.C.

(57) ABSTRACT

A receiver includes a first detector that detects a Received Signal Strength Indicator of a desiring signal wave transmitted from a transmitter, a second detector that detects a power of interfering wave generated by an external device, a transmission rate selection processor that selects a transmission rate, which is used to transmit a signal from the transmitter to the receiver, from among a plurality of transmission rates based on the detected Received Signal Strength Indicator of the desiring signal wave and a detected power of the interfering wave, when the second detector detects generation of the interfering wave, and a transmission rate notificator that notifies the transmitter of the transmission rate selected by the transmission rate selection processor.

16 Claims, 25 Drawing Sheets

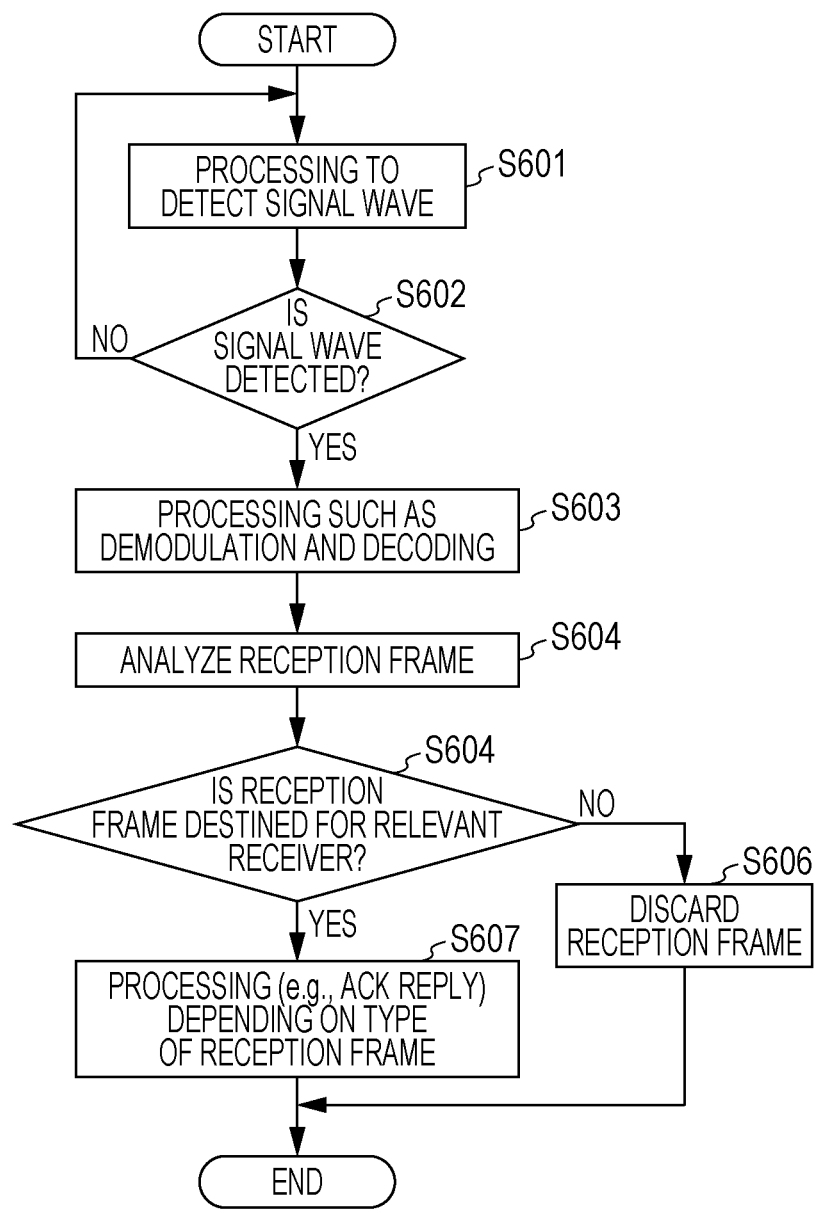

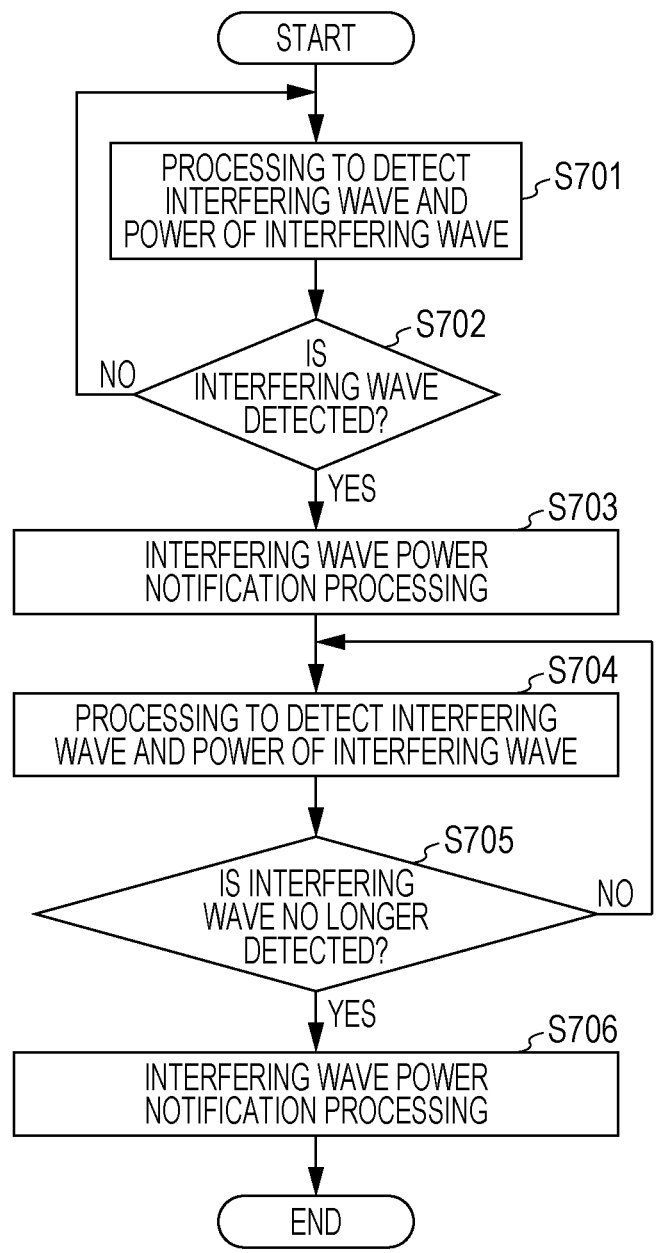

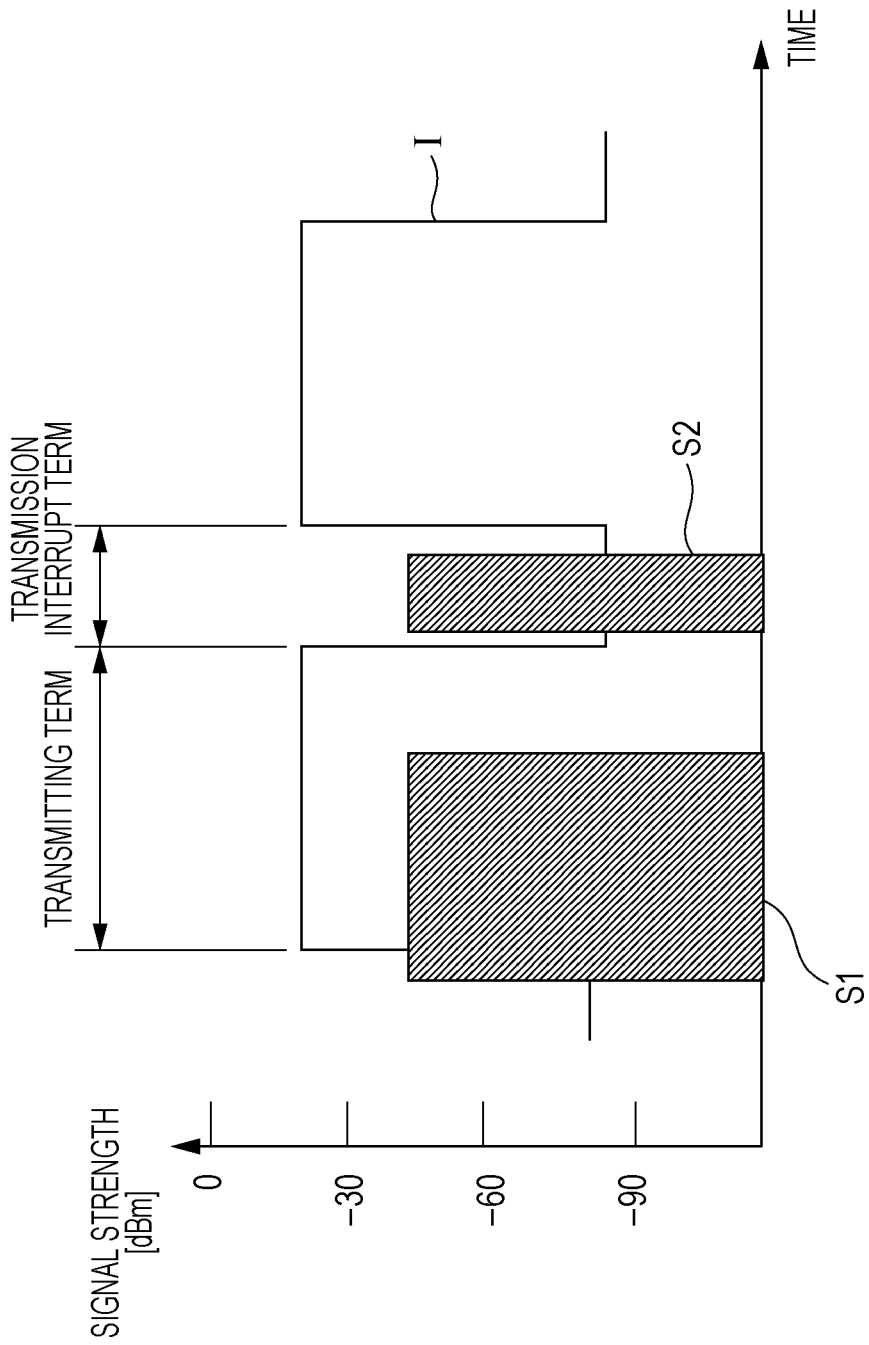

ns and Figures. The benefits and/or
WIRELESS COMMUNICATION SYSTEM, RECEIVER, TRANSMITTER, AND TRANSMISSION RATE CONTROL METHOD The present disclosure contains subject matter related to Japanese Patent Application No. 2013-229241 filed in the Japan Patent Office on Nov. 5, 2013, the entire contents of which are incorporated herein by reference.

BACKGROUND

1. Technical Field

The present disclosure relates to a transmission rate control technique for use in transmitting a signal from a transmitter to a receiver in a wireless communication system.

2. Description of the Related Art

A 2.4-GHz wireless frequency band is often used, for example, in wireless communication represented by IEEE (Institute of Electrical and Electronics Engineers) 802.11 standards and IEEE 802.15.4 standards. The 2.4-GHz wireless frequency band is also called an ISM (Industry-Science-Medical) band.

The 2.4-GHz band is utilized in not only devices in association with wireless communication, but also in other devices, such as a microwave oven. Radiant noises from the devices, such as the microwave oven, are generated as waves interfering with a transmitter and a receiver, which perform wireless communication by employing the 2.4-GHz band. Thus, the radiant noise is one factor causing reception errors.

In an environment where the influence of the interfering wave is large, the reception errors can be suppressed by employing a transmission rate (referred to also as a "data transmission speed") at a low speed. On the other hand, because a transmission throughput is also low at the low transmission rate, limited frequency resources cannot be effectively utilized if the low transmission rate is employed at all times.

In view of the above-described situation, there has been proposed so far a transmission rate control technique capable of adaptively selecting, from among a plurality of transmission rates, one transmission rate to be used in the wireless communication depending on the state of a transmission path, which varies with change of the ambient environment.

In the IEEE 802.11b standards, for example, four transmission rates, i.e., 0.1 Mbps, 2 Mbps, 5.5 Mbps, and 11 Mbps, are specified in accordance with the difference in modulation method. Furthermore, in the IEEE 802.11g standards, eight transmission rates, i.e., 54 Mbps, 48 Mbps, 36 Mbps, 24 Mbps, 18 Mbps, 12 Mbps, 9 Mbps and 6 Mbps, are specified in accordance with the difference in modulation method and coding rate.

The transmission rate that is determined corresponding to at least one of the modulation scheme and the coding rate, etc. in the Physical Layer is also referred to as a "PHY rate" in some cases. Furthermore, in the IEEE 802.11 standards, the transmission rate is also called an MCS (Modulation and Coding Scheme).

One example of the transmission rate control technique is disclosed in Japanese Unexamined Patent Application Publication No. 2001-103041. According to the transmission rate control technique disclosed in Japanese Unexamined Patent Application Publication No. 2001-103041, error rates are measured by performing transmission and reception of test data plural times for each of combinations of communication frequencies and data transmission speeds, and the communication frequency and the data transmission speed, which provide the lowest error rate, are selected as an optimum communication frequency and an optimum data transmission speed for use in wireless communication.

Radiant noise of a microwave over, for example, is periodic noise (see a waveform denoted by reference symbol I in FIG. 28).

Japanese Unexamined Patent Application Publication No. 9-93155 discloses a technique for, when periodic noise is generated as an interfering wave in wireless communication, reducing reception errors in consideration of periodicity of the noise. According to the technique disclosed in Japanese Unexamined Patent Application Publication No. 9-93155, the period of the interfering wave is determined. And fall and rise timings of the interfering wave are determined. And a signal is transmitted and received during a term from the fall timing to the rise timing of the interfering wave (hereinafter called a "transmission interrupt term").

However, the above-mentioned related art has the problem that, in an environment where an interference source is present near a receiver, it takes a long time to select the transmission rate that is adapted for the environment around the receiver.

SUMMARY

One aspect of the present disclosure provides a wireless communication system capable of, in an environment where an interference source is present near a receiver, selecting a transmission rate adapted for the environment around the receiver in a short time.

Thus, according to one aspect of the present disclosure, there is provided a wireless communication system that performs wireless communication between a transmitter and a receiver, wherein the receiver includes a first detector that detects a Received Signal Strength Indicator of a desiring signal wave transmitted from the transmitter, a second detector that detects a power of an interfering wave generated by an external device and power of the interfering wave, a transmission rate selection processor that selects a transmission rate, which is used to transmit a signal from the transmitter to the receiver, from among a plurality of transmission rates based on the detected Received Signal Strength Indicator of the desiring signal wave and a detected power of the interfering wave, when the second detector detects generation of the interfering wave, and a transmission rate notificator that notifies the transmitter of the selected transmission rate, as a transmission rate used to transmit a signal from the transmitter to the receiver, and wherein the transmitter includes a transmission rate controller that changes the transmission rate, which is used to transmit a signal to the receiver, to the notified transmission rate, when the transmitter receives the notification of the transmission rate from the receiver. These general and specific aspects may be implemented using a system, a method, and a computer program, and any combination of systems, methods, and computer programs With the wireless communication system according to one aspect of the present disclosure, even in an environment where an interference source is present near the receiver, the transmission rate adapted for the environment around the receiver can be selected in a short time. Additional benefits and advantages of the disclosed embodiments will be apparent from the specification and Figures. The benefits and/or advantages may be individually provided by the various embodiments and features of the specification and Figures, and need not all be provided in order to obtain one or more of the same.

BRIEF DESCRIPTION OF THE DRAWINGS

FIG. 26 is a flowchart of reception processing executed by a receiver in FIG. 24.

FIG. 27 is a flowchart of interfering-wave power detection and notification processing, executed by the receiver in FIG. 24.

FIG. 28 is an illustration to explain overlap of a periodic interfering wave and a desiring signal wave.

DETAILED DESCRIPTION

Underlying Knowledge Forming Basis of the Present Disclosure

In the transmission rate control technique disclosed in Japanese Unexamined Patent Application Publication No. 2001-103041, it is required to measure error rates by performing transmission and reception of test data plural times for each of combinations of communication frequencies and data transmission speeds. Such necessity raises the problem that a long time is taken until selecting the communication frequency and the data transmission speed, which are to be used in transmission and reception of actual data, and that start of the transmission and the reception of actual data is delayed.

In the technique disclosed in Japanese Unexamined Patent Application Publication No. 9-93155, the term during which signals are transmitted and received is limited to the transmission interrupt term. This leads to the problem that a long time is taken from start of signal transmission to completion of the signal transmission.

A solution to the above-described problems is conceivable on the basis of the following idea. When power of an interfering wave near a receiver is low and when the received signal strength of a desiring signal wave transmitted from a transmitter to the receiver is high, i.e., when a signal to interference ratio is large, a reception error does not occur even if a signal is transmitted from the transmitter to receiver during a term from the rise timing to the fall timing of the interfering wave (hereinafter called a "transmitting term").

Furthermore, comparing a low transmission rate and a high transmission rate, it is usual that the low transmission rate is superior in error tolerance to the high transmission rate, but the former takes a longer transmission time than the latter. In the environment where the interfering wave is present near the receiver as illustrated in FIG. 28, therefore, a probability of overlap of the transmission time with the transmitting term is higher at the low transmission rate than at the high transmission rate. Thus, in a state under generation of the periodic interfering wave, a probability of reception errors is not always lower at the low transmission rate than at the high transmission rate. In FIG. 28, reference symbol I denotes the periodic interfering wave, S1 denotes a desiring signal wave of the low transmission rate, and S2 denotes a desiring signal of the high transmission rate.

First Embodiment

A first embodiment according to the present disclosure will be described below with reference to the drawings.

Figure 1:
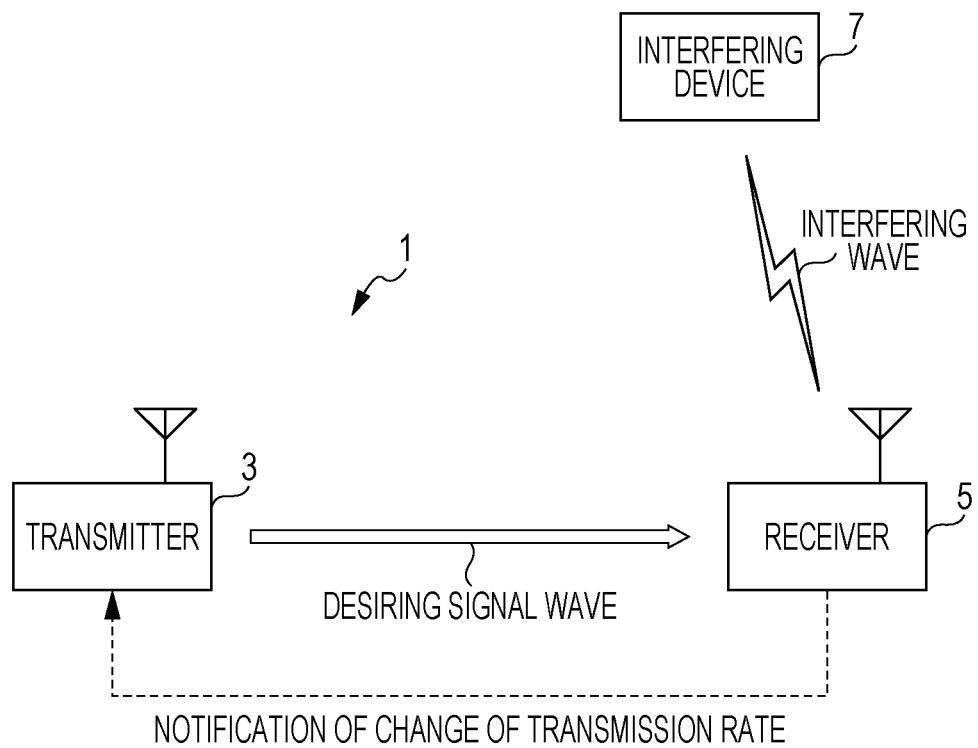
FIG. 1 is a block diagram illustrating the system configuration of a wireless communication system according to a first embodiment.
Figure 2:
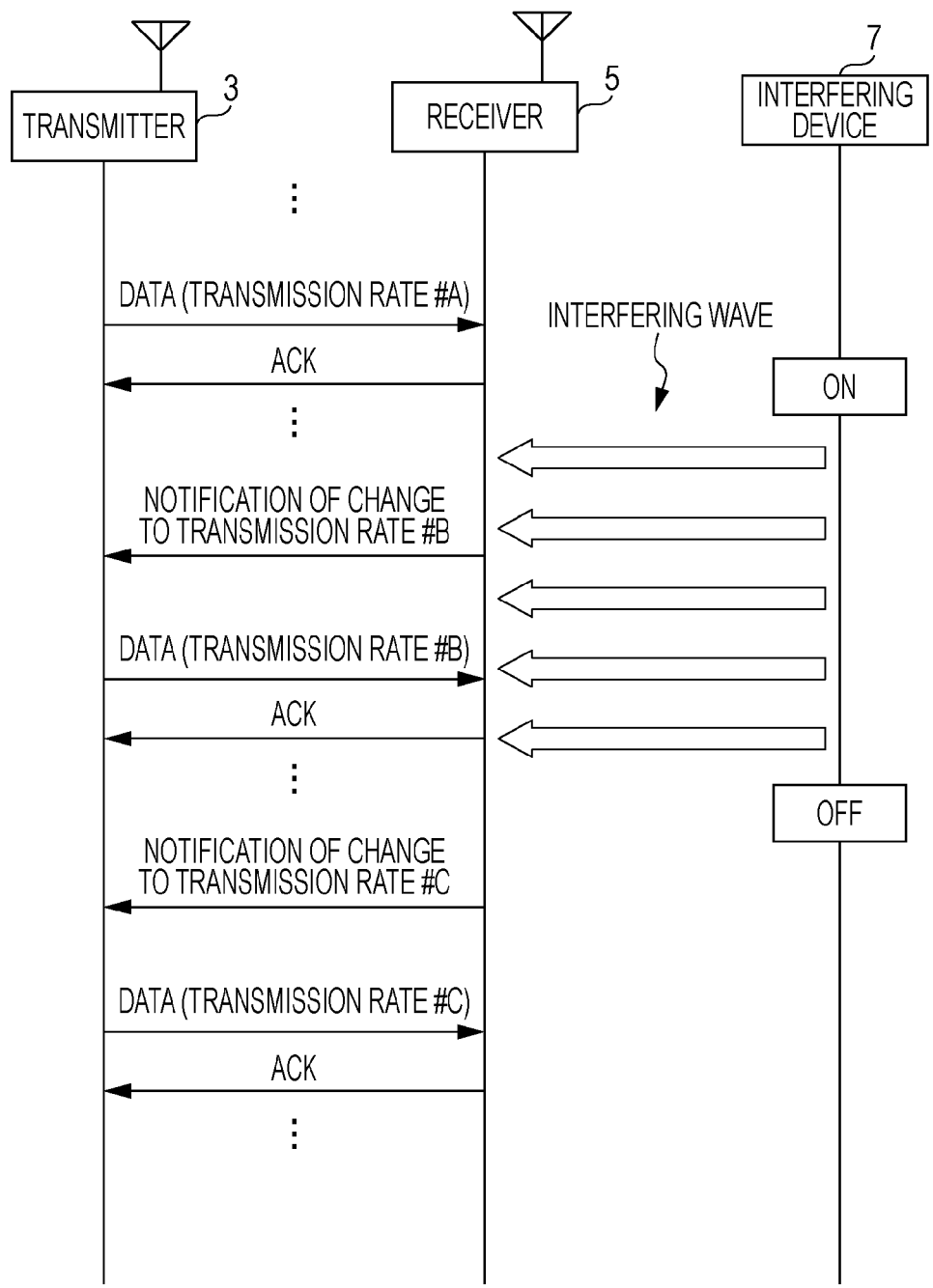
FIG. 2 is a sequence chart illustrating one example of the operation of the wireless communication system illustrated in FIG. 1.

The configuration and the operation of a wireless communication system according to the first embodiment are described with reference to FIGS. 1 and 2. FIG. 1 is a block diagram illustrating the system configuration of the wireless communication system according to the first embodiment, and FIG. 2 is a sequence chart illustrating one example of the operation of the wireless communication system illustrated in FIG. 1.

As illustrated in FIG. 1, a wireless communication system 1 includes a transmitter 3 and a receiver 5 as wireless communication devices. The wireless communication system 1 may further include one or more wireless communication devices in addition to the transmitter 3 and the receiver 5 in some cases.

An interfering device 7 in FIG. 1 is an external device, e.g., a microwave oven, which is a source generating an interfering wave. The external device, e.g., the microwave oven, generates radiant noise having periodicity, as denoted by reference symbol I in FIG. 28.

In the first embodiment and other embodiments described later, the expression "start of generation of the interfering wave" implies a state where an operation switch of the interfering device 7 is turned on and radiant noise is generated and then reaches the receiver 5 as the interfering wave, and the expression "end of generation of the interfering wave" implies a state where the operation switch of the interfering device 7 is turned off and the radiant noise does not reach the receiver 5.

As illustrated in FIG. 2, the transmitter 3 transmits a data signal to the receiver 5 by employing a transmission rate #A (e.g., an initially set transmission rate or a post-change transmission rate notified from the receiver 5 in advance).

The receiver 5 receives the data signal transmitted to the receiver 5, detects the RSSI (Received Signal Strength Indicator) of a signal wave (one example of the desiring signal wave) of the data signal destined for the receiver 5, and holds a detected value of the RSSI.

The receiver 5 sends an ACK (Acknowledgement) signal to the transmitter 3, and the transmitter 3 receives the ACK signal sent to the transmitter 3.

The operation switch of the interfering device 7 is turned on, and radiant noise is generated from the interfering device 7.

The radiant noise is generated as a wave interfering with the receiver 5. The receiver 5 detects start of generation of the interfering wave and power of the interfering wave. The receiver 5 selects, as a transmission rate to be newly used in signal transmission from the transmitter 3 to the receiver 5 (hereinafter referred to as a "post-change transmission rate"), a transmission rate #B from among a plurality of transmission rates based on both the latest detected value of RSSI of the desiring signal wave and the latest detected value of the interfering wave power. Then, the receiver 5 sends a transmission rate change notification signal, including the transmission rate #B, to the transmitter 3.

The interfering wave power used when selecting the transmission rate may be, for example, a mean value of the interfering wave power during the transmitting term, or a mean value of the interfering wave power during a total term including the transmitting term and the transmission interrupt term. Alternatively, a maximum value of the interfering wave power may be used instead of the mean value of the interfering wave power.

The transmitter 3 receives the transmission rate change notification signal sent to the transmitter 3, and changes the transmission rate, which is used in signal transmission from the transmitter 3 to the receiver 5, to the post-change transmission rate (i.e., the transmission rate #B) that is included in the transmission rate change notification signal destined for the transmitter 3.

The transmitter 3 transmits a data signal to the receiver 5 by employing the transmission rate #B after the change. The receiver 5 receives the data signal sent to the receiver 5, detects the RSSI of a signal wave of the data signal destined for the receiver 5, and holds a detected value of the RSSI. Then, the receiver 5 sends an ACK signal to the transmitter 3, and the transmitter 3 receives the ACK signal sent to the transmitter 3.

The first embodiment and later-described second to fourth embodiments are described in connection with the case where the detected value of RSSI of the desiring signal wave is newly held even during the term in which the interfering wave is generated, and is used in the transmission rate selection processing that is executed upon detection of the end of generation of the interfering wave. However, the receiver 5 may not newly hold the detected value of RSSI of the desiring signal wave during the term in which the interfering wave is generated, and may use the detected value of RSSI of the desiring signal wave, which has been detected before the generation of the interfering wave, in the transmission rate selection processing that is executed when the end of generation of the interfering wave is detected.

The operation switch of the interfering device 7 is turned off, and the generation of the radiant noise from the interfering device 7 is ceased.

The receiver 5 detects the end of generation of the interfering wave and the power of the interfering wave (at this time, the detected value of the interfering wave power is given as a value of noise power around the receiver 5 when neither the signal wave nor the interfering wave reaches the receiver 5). The receiver 5 newly selects, as a post-change transmission rate, a transmission rate #C from among the plural transmission rates based on both the latest detected value of RSSI of the desiring signal wave and the latest detected value of the interfering wave power. Then, the receiver 5 sends a transmission rate change notification signal, including the transmission rate #C, to the transmitter 3.

The transmitter 3 receives the transmission rate change notification signal sent to the transmitter 3, and changes the transmission rate, which is used in signal transmission from the transmitter 3 to the receiver 5, to the post-change transmission rate (i.e., the transmission rate #C) that is included in the transmission rate change notification signal destined for the transmitter 3.

The transmitter 3 transmits a data signal to the receiver 5 by employing the transmission rate #C after the change. The receiver 5 receives the data signal sent to the receiver 5, detects the RSSI of a signal wave of the data signal destined for the receiver 5, and holds a detected value of the RSSI. Then, the receiver 5 sends an ACK signal to the transmitter 3, and the transmitter 3 receives the ACK signal sent to the transmitter 3.

Figure 3:
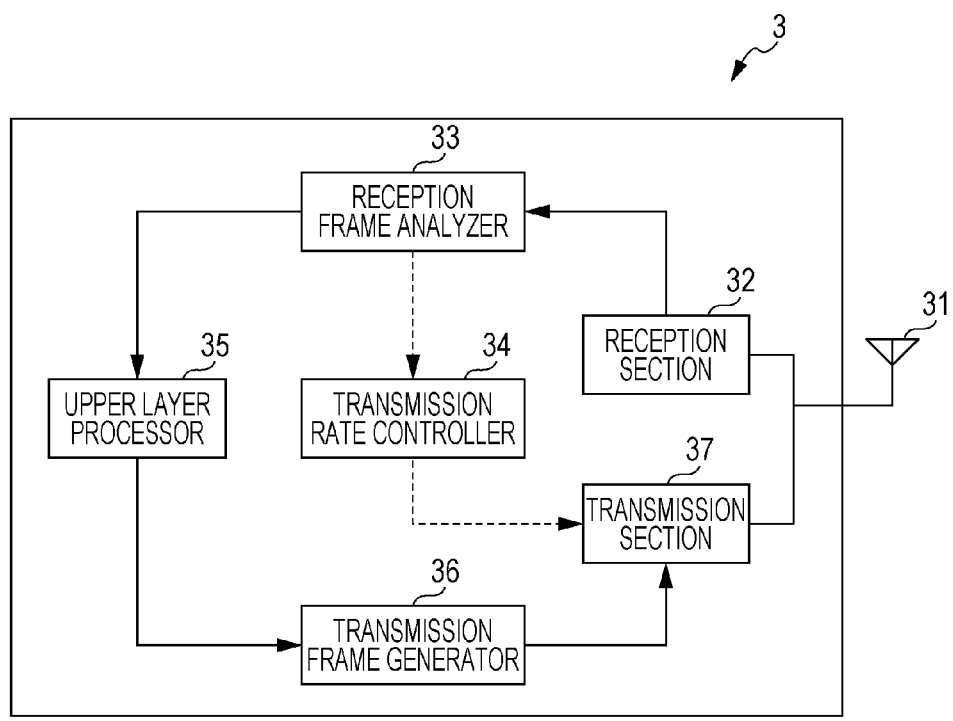
FIG. 3 is a block diagram illustrating the configuration of a transmitter in FIG. 1.

The configuration of the transmitter 3 in FIG. 1 will be described below with reference to FIG. 3. FIG. 3 is a block diagram illustrating the configuration of the transmitter 3 in FIG. 1. It is to be noted that, in FIG. 3 and FIGS. 4, 5, 12, 15, 18, 23 and 24 described later, solid-line arrows denote flows of data, and dotted-line arrows denote flows of control signals.

As illustrated in FIG. 3, the transmitter 3 includes a transmission/reception antenna 31, a reception section 32, a reception frame analyzer 33, a transmission rate controller 34, an upper layer processor 35, a transmission frame generator 36, and a transmission section 37.

The reception section 32 has the function of mainly executing processing in the Physical Layer. The processing in the Physical Layer includes, for example, processing to detect the signal wave, AGC (Auto Gain Control), AFC (Auto Frequency Control), channel estimation, channel equalization, demodulation, and decoding.

The reception frame analyzer 33 has the function of mainly executing processing in the MAC (Media Access Control) layer, e.g., the function of analyzing the contents of a MAC header of a reception frame. In the first embodiment and the later-described second to fourth embodiments, when the reception frame is a transmission rate change notification frame destined for the relevant transmitter 3, the reception frame analyzer 33 extracts the post-change transmission rate from the transmission rate change notification frame, and outputs the extracted post-change transmission rate to the transmission rate controller 34 together with a MAC address of a transmission source of the transmission rate change notification frame.

The transmission rate change notification frame is a newly specified frame that is not specified in the IEEE 802.11 standards.

The transmission rate change notification frame includes a MAC header, a frame body, and an FCS (Frame Check Sequence). The FCS is used in error check of the MAC header and the frame body. The MAC header of the transmission rate change notification frame includes not only a transmission source address (MAC address of the transmission source) and a destination address (MAC address of the destination), but also a type value and a subtype value, which are assigned to the transmission rate change notification frame. The frame body includes information representing the post-change transmission rate (i.e., post-change transmission rate information).

The transmission rate controller 34 executes, for the transmission section 37, control to change the transmission rate, which is used in signal transmission to the device as the transmission source of the transmission rate change notification frame, to the post-change transmission rate having been received from the reception frame analyzer 33. It is here assumed that, as initial setting, one of the plural transmission rates is previously set in the transmission section 37.

The upper layer processor 35 has the function of mainly executing protocol processing in upper layers (such as IF (Internet Protocol) layer) than the MAC layer.

The transmission frame generator 36 has the function of mainly executing processing in the MAC layer, such as generation of a transmission frame (including, e.g., a data frame and an ACK frame).

The data frame and the ACK frame are frames that are specified in the IEEE 802.11 standards. A MAC header of the data frame includes, e.g., a transmission source address, a destination address, a type value, and a subtype value, the latter two being assigned to the data frame. A MAC header of the ACK frame includes, e.g., the destination address, a type value, and a subtype value, the latter two being assigned to the ACK frame.

The transmission section 37 has the function of mainly executing processing in the Physical Layer, and transmits a signal wave through the transmission/reception antenna 31. The processing in the Physical Layer includes, for example, coding and modulation that are executed on the transmission frame. The transmission rate set in the transmission rate controller 34 is used in the coding and the modulation that are executed on the transmission frame.

Figure 4:
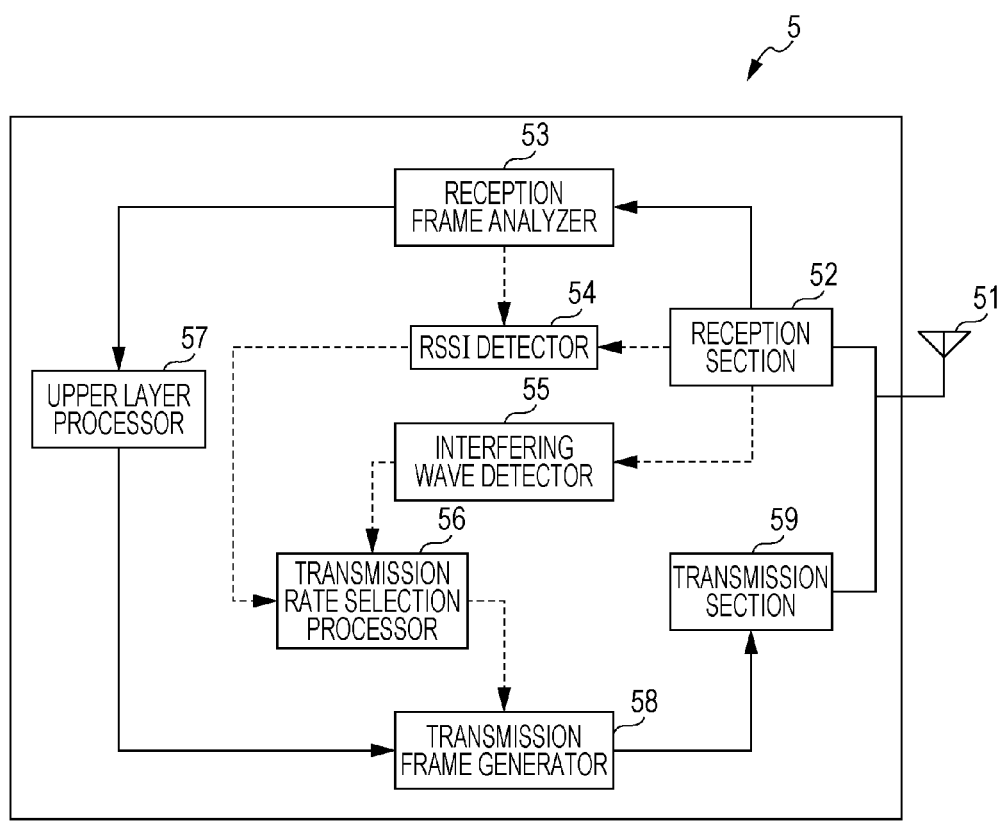
FIG. 4 is a block diagram illustrating the configuration of a receiver in FIG. 1.

The configuration of the receiver 5 in FIG. 1 will be described below with reference to FIG. 4. FIG. 4 is a block diagram illustrating the configuration of the receiver 5 in FIG. 1.

As illustrated in FIG. 4, the receiver 5 includes a transmission/reception antenna 51, a reception section 52, a reception frame analyzer 53, an RSSI detector 54, an interfering wave detector 55, a transmission rate selection processor 56, an upper layer processor 57, a transmission frame generator 58, and a transmission section 59.

The reception section 52 has the function of mainly executing processing in the Physical Layer. The processing in the Physical layer includes, e.g., those types of processing that have been described above in connection with the reception section 32 of the transmitter 3.

The reception frame analyzer 53 has the function of mainly executing processing in the MAC layer, e.g., the function of analyzing the contents of a MAC header of a reception frame. In the first embodiment and the later-described second to fourth embodiments, when the reception frame is the MAC frame destined for the relevant receiver 5, the reception frame analyzer 53 outputs a notice, indicating that the reception frame is the MAC frame destined for the relevant receiver 5, to the RSSI detector 54 together with a MAC address of a transmission source of the reception frame.

The RSSI detector 54 has the function of executing processing to detect the RSSI (Received Signal Strength Indicator) of a signal wave. When the RSSI detector 54 receives, from the reception frame analyzer 53, a notice indicating that the reception frame is the MAC frame destined for the relevant receiver 5, the RSSI detector 54 holds the detected value of RSSI of the signal wave (desiring signal wave), which corresponds to the reception frame, in relation to the MAC address of the transmission source of the reception frame.

The interfering wave detector 55 executes processing to detect an interfering wave generated from an external device and power of the interfering wave. Upon detecting start of generation of the interfering wave, the interfering wave detector 55 outputs, to the transmission rate selection processor 56, a notice indicating that the start of generation of the interfering wave has been detected, together with the detected value of the interfering wave. Furthermore, upon detecting end of generation of the interfering wave, the interfering wave detector 55 outputs, to the transmission rate selection processor 56, a notice indicating that the end of generation of the interfering wave has been detected, together with the detected value of the interfering wave power (at this time, the detected value of the interfering wave power is given as a value of noise power around the receiver 5 when neither the signal wave nor the interfering wave reaches the receiver 5).

For example, when radiant noise radiated from an external device, such as a microwave oven, has periodicity, the interfering wave detector 55 detects the start and the end of generation of the interfering wave based on whether it receives periodic noise or not.

The transmission rate selection processor 56 receives, from the interfering wave detector 55, the notice indicating that the start of generation of the interfering wave has been detected, or the notice indicating that the end of generation of the interfering wave has been detected, together with the detected value of the interfering wave power. Furthermore, the transmission rate selection processor 56 obtains, from the RSSI detector 54, the detected value of RSSI of the desiring signal wave (i.e., the latest detected value of RSSI)

and the MAC address of the transmission source of the relevant desiring signal wave. Then, the transmission rate selection processor 56 selects a post-change transmission rate from among a plurality of transmission rates based on both the detected value of RSSI of the desiring signal wave, which has been obtained from the RSSI detector 54, and the detected value of the interfering wave power, which has been received from the interfering wave detector 55. Subsequently, the transmission rate selection processor 56 outputs, to the transmission frame generator 58, the selected post-change transmission rate together with the MAC address of the transmission source of the desiring signal wave that has been received from the RSSI detector 54. The detailed configuration of the transmission rate selection processor 56 is described later with reference to FIGS. 5 and 6.

The upper layer processor 57 has the function of mainly executing protocol processing in upper layers (such as IP layer) than the MAC layer.

The transmission frame generator 58 has the function of mainly executing processing in the MAC layer, such as generation of a transmission frame (including, e.g., a data frame, an ACK frame, and a transmission rate change notification frame). A MAC header of the transmission rate change notification frame contains the MAC address of the receiver 5 as a transmission source address, the MAC address of the device, which has transmitted the desiring signal wave, as a destination address, and the values, which have been assigned to the transmission rate change notification frame, as a type value and a subtype value. A frame body of the transmission rate change notification frame contains the post-change transmission rate that has been selected by the transmission rate selection processor 56.

The transmission section 59 has the function of mainly executing processing in the Physical Layer, and transmits a signal wave through the transmission/reception antenna 51. The processing in the Physical Layer includes, for example, coding and modulation that are executed on the transmission frame.

Figure 5:
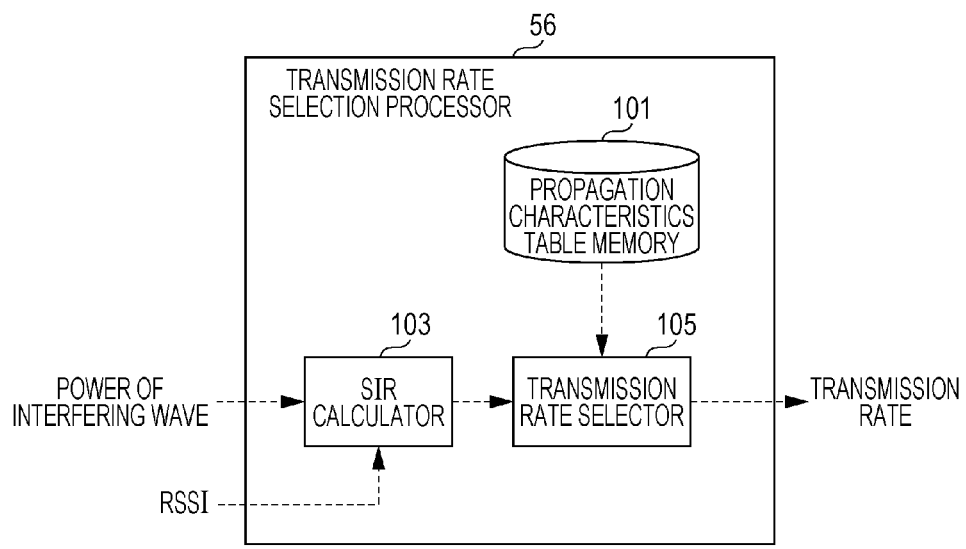
FIG. 5 is a block diagram illustrating the configuration of a transmission rate selection processor in FIG. 4.

The configuration of the transmission rate selection processor 56 in FIG. 4 will be described below with reference to FIG. 5. FIG. 5 is a block diagram illustrating the configuration of the transmission rate selection processor 56 in FIG. 4.

As illustrated in FIG. 5, the transmission rate selection processor 56 includes a propagation characteristics table memory 101, an SIR (Signal to Interference Ratio) calculator 103, and a transmission rate selector 105.

The propagation characteristics table memory 101 stores, in a propagation characteristics table, relation information representing the relation between an SIR and a transmission rate. The propagation characteristics table is prepared in advance.

Figure 6:
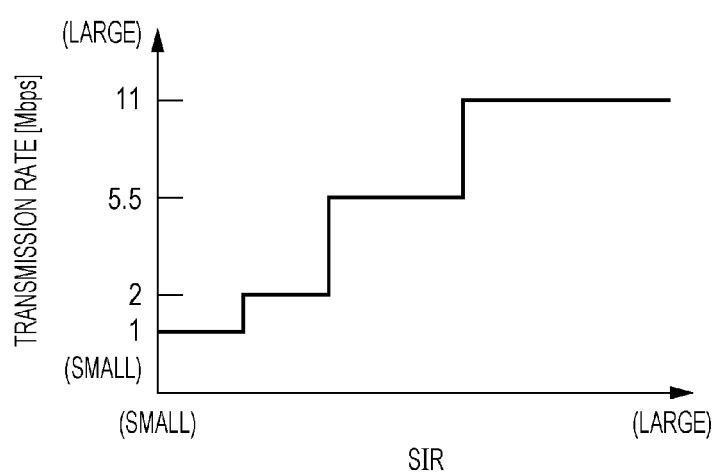
FIG. 6 illustrates one example of a propagation characteristics table that is stored in a propagation characteristics table memory in FIG. 5.

FIG. 6 illustrates one example of a propagation characteristics table that is stored in the propagation characteristics table memory 101. In the case of wireless communication in accordance with the IEEE 802.11b standards, for example, since four transmission rates, i.e., 1 Mbps, 2 Mbps, 5.5 Mbps, and 11 Mbps, are specified in the IEEE 802.11b standards, the propagation characteristics table stores information representing the relation between each of the four transmission rates, i.e., 1 Mbps, 2 Mbps, 5.5 Mbps, and 11 Mbps, and the SIR. In FIG. 6, the horizontal axis indicates the SIR, and the vertical axis indicates the transmission rate (Mbps).

The SIR calculator 103 calculates a ratio of the detected value of RSSI of the desiring signal wave, which has been received from the RSSI detector 54, and the detected value of the interfering wave power, which has been received from the interfering wave detector 55, i.e., an SIR, and then outputs a calculated SIR value to the transmission rate selector 105.

The transmission rate selector 105 selects, as the post-change transmission rate, a transmission rate corresponding to the calculated SIR value, which has been received from the SIR calculator 103, by referring to the propagation characteristics table stored in the propagation characteristics table memory 101, and then outputs the selected post-change transmission rate to the transmission frame generator 58 in FIG. 4.

Figure 7:
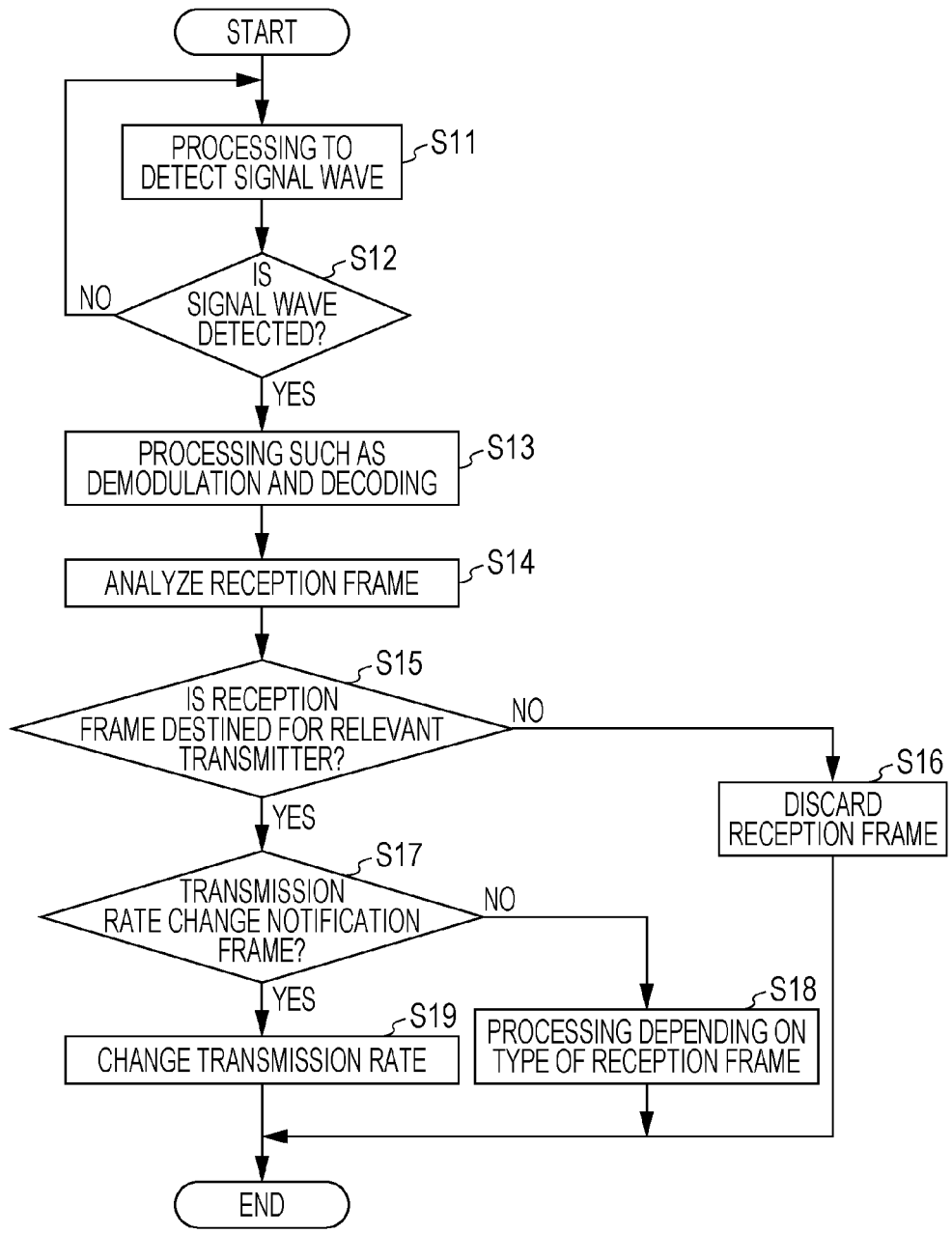
FIG. 7 is a flowchart of reception processing, including transmission rate change processing, executed by the transmitter in FIG. 3.

Reception processing, including processing to change the transmission rate, executed by the transmitter 3 in FIG. 3 will be described below with reference to FIG. 7. FIG. 7 is a flowchart of the reception processing, including the transmission rate change processing, executed by the transmitter 3 in FIG. 3. It is to be noted that the flowchart of FIG. 7 represents a processing flow when the transmitter 3 receives one signal.

The reception section 32 of the transmitter 3 executes processing to detect a signal wave (step S11) sent from any of wireless communication devices, including the receiver 5. Until the signal wave is detected in the signal wave detection processing in step S11 (in case of S12: No), the reception section 32 continuously executes the processing to detect the signal wave in step S11. If the signal wave is detected (S12: Yes), the reception section 32 executes predetermined processing, such as demodulation and decoding, on the detected signal wave (step S13), and the reception frame analyzer 33 analyzes the contents of a MAC header of a reception frame (step S14).

The reception frame analyzer 33 determines, based on a destination address in the MAC header of the reception frame, whether the reception frame is a MAC frame destined for the relevant transmitter 3 (step S15). If the reception frame is not the MAC frame destined for the relevant transmitter (S15: No), the reception frame analyzer 33 discards the reception frame (step S16).

On the other hand, if the reception frame is the MAC frame destined for the relevant transmitter 3 (S15: Yes), the reception frame analyzer 33 determines, based on a type value and a subtype value in the MAC header, whether the reception frame is the transmission rate change notification frame (step S17). If the reception frame is not the transmission rate change notification frame (step S17: No), the transmitter 3 executes processing depending on the type of the reception frame (step S18).

On the other hand, if the reception frame is the transmission rate change notification frame (S17: Yes), the reception frame analyzer 33 extracts the post-change transmission rate from the transmission rate change notification frame. Then, the transmission rate controller 34 controls the transmission section 37 such that the transmission rate used to transmit a signal from the relevant transmitter 3 to the device, which is the transmission source of the transmission rate change notification frame, is changed to the extracted post-change transmission rate (step S19).

Figure 8:
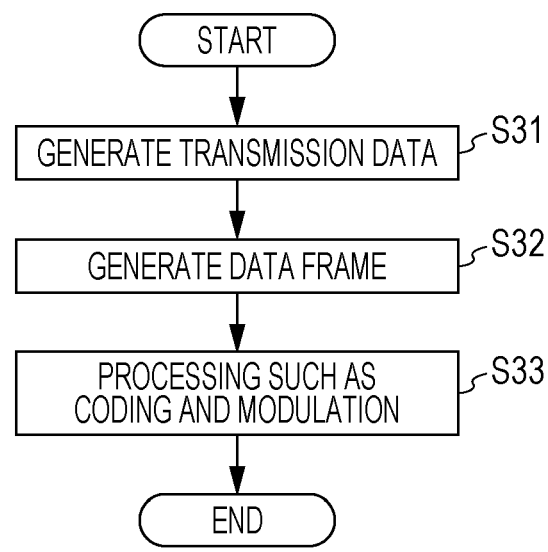
FIG. 8 is a flowchart of transmission processing executed by the transmitter in FIG. 3.

Transmission processing executed by the transmitter 3 in FIG. 3 will be described below with reference to FIG. 8. FIG. 8 is a flowchart of the transmission processing executed by the transmitter 3 in FIG. 3. It is to be noted that the flowchart of FIG. 8 represents a processing flow when the transmitter 3 transmits a signal related to one transmission data.

The upper layer processor 35 executes protocol processing to generate transmission data (step S31). Then, the transmission frame generator 36 stores the transmission data, transferred from the upper layer processor 35, in a frame body, and adds a MAC header and an FCS to the frame body, thus generating a data frame (step S32). Then, the transmission section 37 executes predetermined processing, such as coding and modulation, at the transmission rate that has been initially set for the data frame, or that has been set in the processing of step S19 in FIG. 7. Thereafter, the transmission section 37 transmits a signal wave related to the data frame through the transmission/reception antenna 31 (step S33).

Figure 9:
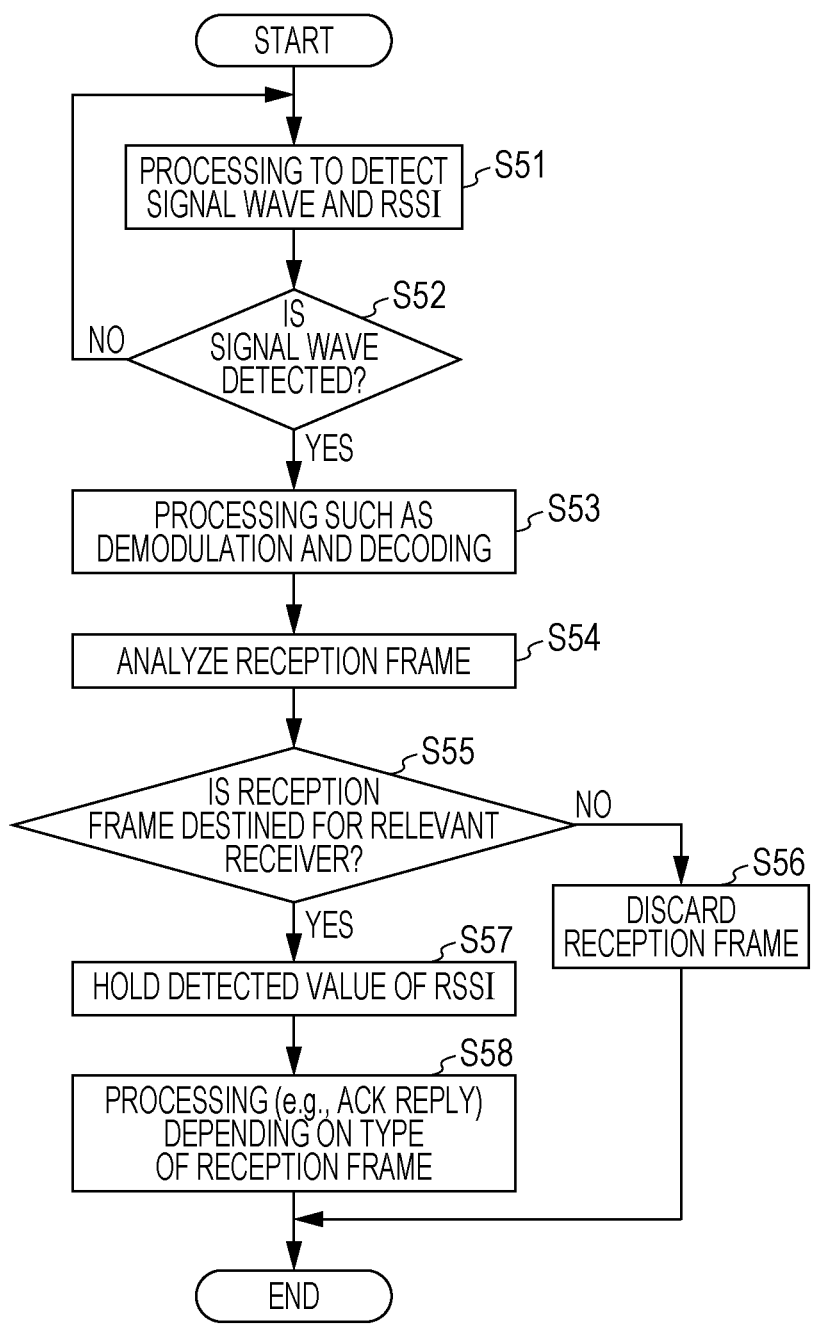
FIG. 9 is a flowchart of reception processing executed by the receiver in FIG. 4.

Reception processing executed by the receiver 5 in FIG. 4 will be described below with reference to FIG. 9. FIG. 9 is a flowchart of the reception processing executed by the receiver 5 in FIG. 4. It is to be noted that the flowchart of FIG. 9 represents a processing flow when the receiver 5 receives one signal.

The reception section 52 of the receiver 5 executes processing to detect a signal wave, which has been transmitted by any of wireless communication devices, including the transmitter 3, and the RSSI detector 54 executes processing to detect the RSSI of the signal wave (step S51). Until the signal wave is detected in the signal wave detection processing in step S51 (in case of S52: No), the reception section 52 continuously executes the processing to detect the signal wave in step S51 and the RSSI detector 54 continuously executes processing to detect the RSSI of the signal wave in step S51. If the signal wave is detected (S52: Yes), the reception section 52 executes predetermined processing, such as demodulation and decoding, on the detected signal wave (step S53), and the reception frame analyzer 53 analyzes the contents of a MAC header of a reception frame (step S54).

The reception frame analyzer 53 determines, based on the destination address in the MAC header of the reception frame, whether the reception frame is a MAC frame destined for the relevant receiver 5 (step S55). If the reception frame is not the MAC frame destined for the relevant receiver 3 (S55: No), the reception frame analyzer 53 discards the reception frame (step S56).

On the other hand, if the reception frame is the MAC frame destined for the relevant receiver 3 (S55: Yes), the RSSI detector 54 holds, as a detected value of RSSI of the desiring signal wave, the value of RSSI detected when the signal wave has been detected in step S51 (step S57). Then, the receiver 5 executes processing (e.g., ACK reply processing) depending on the type of the reception frame (step S58).

Figure 10:
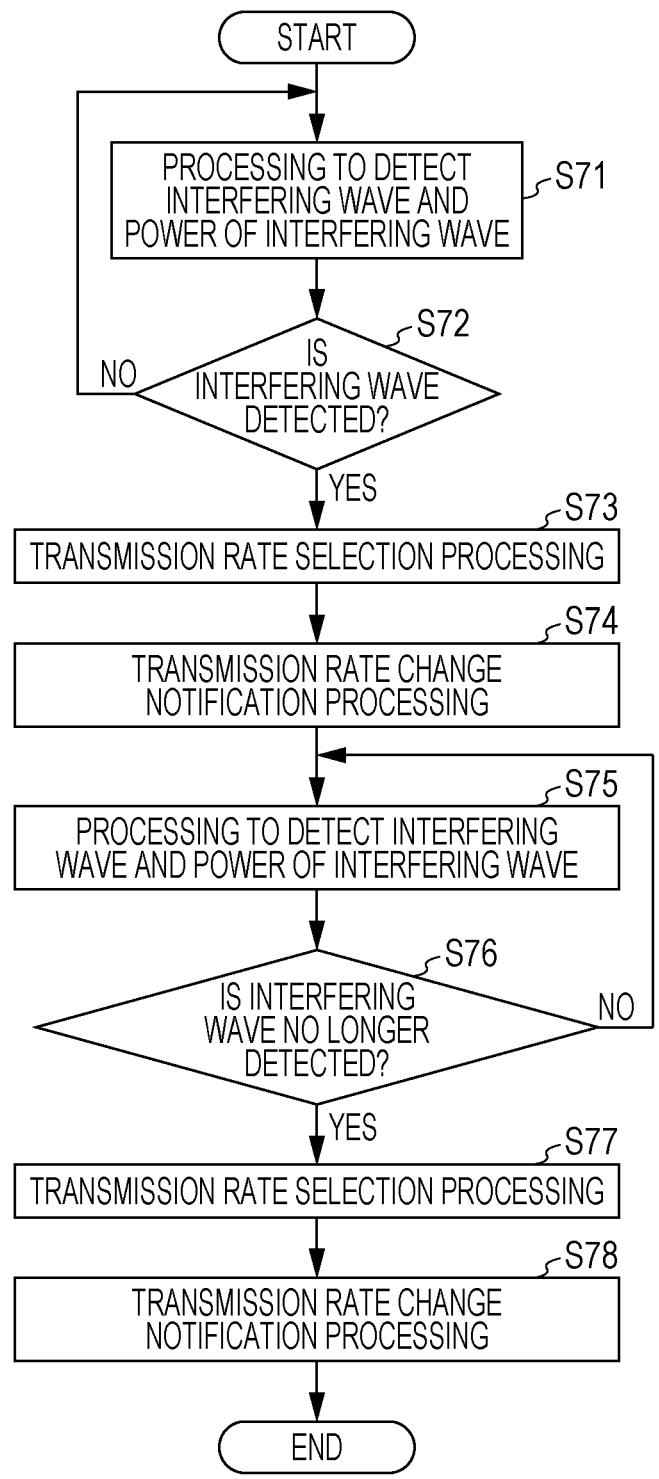
FIG. 10 is a flowchart of a process, including transmission rate selection processing, executed by the receiver in FIG. 4.

A process, including processing to select the transmission rate, executed by the receiver 5 in FIG. 4 will be described below with reference to FIG. 10. FIG. 10 is a flowchart of the process, including the transmission rate selection processing, executed by the receiver 5 in FIG. 4. It is to be noted that the flowchart of FIG. 10 represents a processing flow executed by the receiver 5 in relation to one operation of the interfering device 7.

The interfering wave detector 55 executes processing to detect an interfering wave and power of the interfering wave (step S71). Until the start of generation of the interfering wave is detected in step S71 (in case of S72: No), the interfering wave detector 55 continuously executes the processing to detect the interfering wave and the power of the interfering wave in the processing of step S71.

If the start of generation of the interfering wave is detected (S72: Yes), the transmission rate selection processor 56 executes transmission rate selection processing to select a post-change transmission rate (step S73) by employing the detected value of RSSI of the desiring signal wave, which has been held in step S57 of FIG. 9, and the detected value of the interfering wave power, which has been detected in step S71. The transmission frame generator 58 generates a transmission rate change notification frame including the post-change transmission rate that has been selected in step S73. Then, the transmission section 59 executes predetermined processing, such as coding and modulation, on the generated transmission rate change notification frame, and sends a signal wave related to the transmission rate change notification frame from the transmission/reception antenna 51 (step S74).

The interfering wave detector 55 further executes the processing to detect the interfering wave and the power of the interfering wave (step S75). Until the end of generation of the interfering wave is detected in step S75 (in case of S76: No), the interfering wave detector 55 continuously executes the processing to detect the interfering wave and the power of the interfering wave in step S75.

If the end of generation of the interfering wave is detected (S76: Yes), the transmission rate selection processor 56 executes the transmission rate selection processing to select a post-change transmission rate by employing the detected value of RSSI of the desiring signal wave, which has been held in step S57 of FIG. 9, and the detected value of the interfering wave power, which has been detected in step S75 (at this time, the detected value of the interfering wave power is given as a value of noise power around the receiver 5 in the state where neither the signal wave nor the interfering wave does not reach the receiver 5) (step S77). The transmission frame generator 58 generates a transmission rate change notification frame including the post-change transmission rate that has been selected in step S77. Then, the transmission section 59 executes predetermined processing, such as coding and modulation, on the generated transmission rate change notification frame, and sends a signal wave related to the transmission rate change notification frame from the transmission/reception antenna 51 (step S78).

Figure 11:
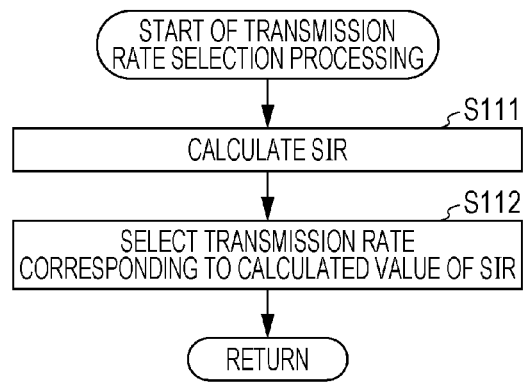
FIG. 11 is a flowchart of the transmission rate selection processing in FIG. 10.

The transmission rate selection processing (steps S73, S77) in FIG. 10 will be described below with reference to FIG. 11. FIG. 11 is a flowchart of the transmission rate selection processing (steps S73, S77) in FIG. 10. It is to be noted that, in the transmission rate selection processing of step S73, the power of the interfering wave is given as power of radiant noise emitted from the interfering device 7, and in the transmission rate selection processing of step S77, it is given as power of noise around the receiver 5 in the state where neither the signal wave nor the interfering wave does not reach the receiver 5. However, because the transmission rate selection processing of step S73 and the transmission rate selection processing of step S77 are substantially the same, those processing steps are described together.

The SIR calculator 103 calculates a ratio of the detected value of RSSI of the desiring signal wave to the detected value of the interfering wave power, i.e., an SIR (step S111).

The transmission rate selector 105 refers to the propagation characteristics table stored in the propagation characteristics table memory 101, and selects a transmission rate corresponding to the calculated value of SIR, which has been calculated in step S111, as a transmission rate (post-change transmission rate) used to transmit a signal from the transmitter 3 to the receiver 5 (step S112).

Second Embodiment

A second embodiment of the present disclosure will be described below with reference to the drawings.

A wireless communication system including a transmitter and a receiver, according to the second embodiment, is substantially the same as the wireless communication system including the transmitter and the receiver, according to the first embodiment, except for the transmission rate selection processing executed by the receiver, which has been described in the first embodiment.

Accordingly, in the second embodiment, the transmission rate selection processing executed by the receiver is described, and descriptions of the transmitter and the receiver, other than the transmission rate selection processing executed by the receiver, are omitted.

Figure 12:
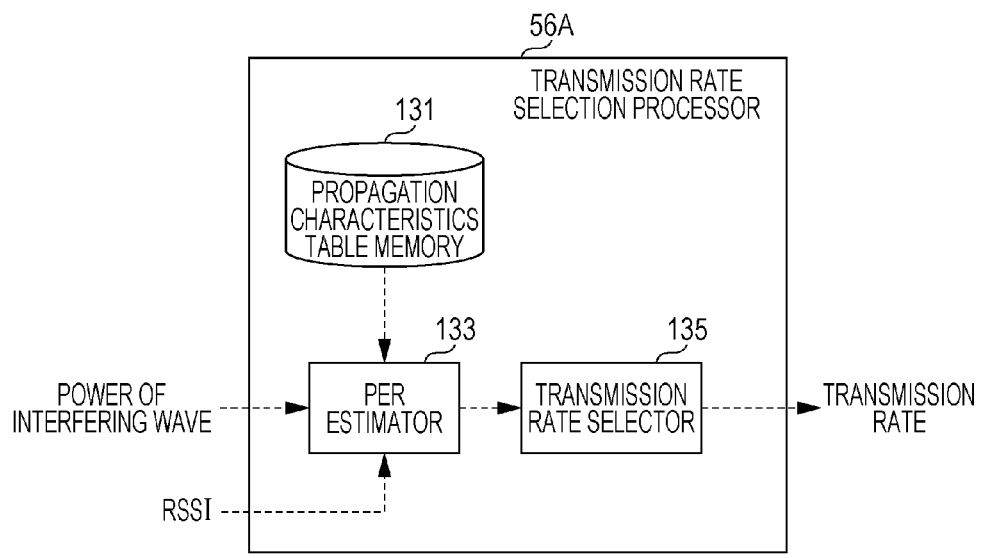
FIG. 12 is a block diagram illustrating the configuration of a transmission rate selection processor in a receiver according to a second embodiment.

First, the configuration of a transmission rate selection processor 56A in the receiver according to the second embodiment will be described below with reference to FIG. 12. FIG. 12 is a block diagram illustrating the configuration of the transmission rate selection processor 56A in the receiver according to the second embodiment.

As illustrated in FIG. 12, the transmission rate selection processor 56A includes a propagation characteristics table memory 131, a PER (Packet Error Rate) estimator 133, and a transmission rate selector 135.

The propagation characteristics table memory 131 stores, in a propagation characteristics table, relation information representing the relation among the RSSI of the desiring signal wave, the power of the interfering wave, and the PER for each of plural transmission rates. It is to be noted that the propagation characteristics table is prepared in advance.

Figure 13A:
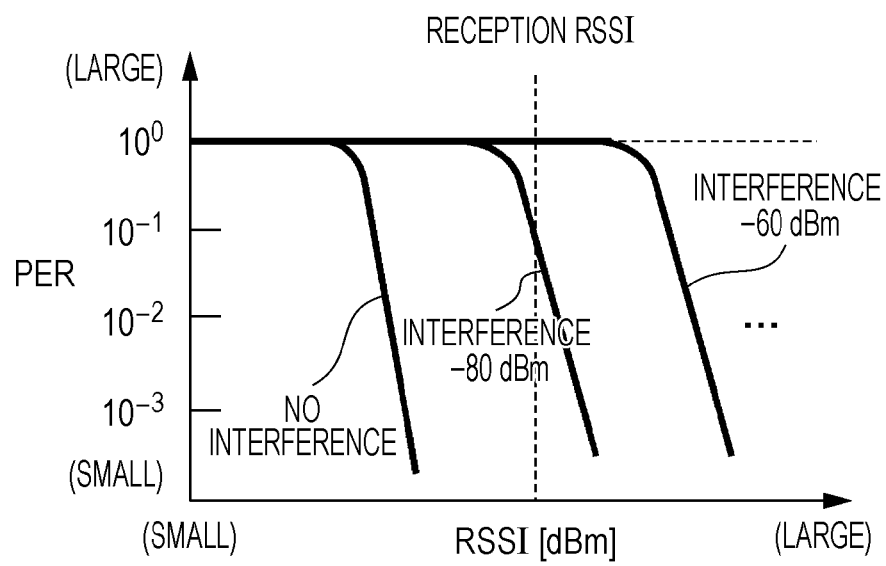
FIGS. 13A and 13B illustrate examples of propagation characteristics tables that are stored in a propagation characteristics table memory in FIG. 12.
Figure 13B:
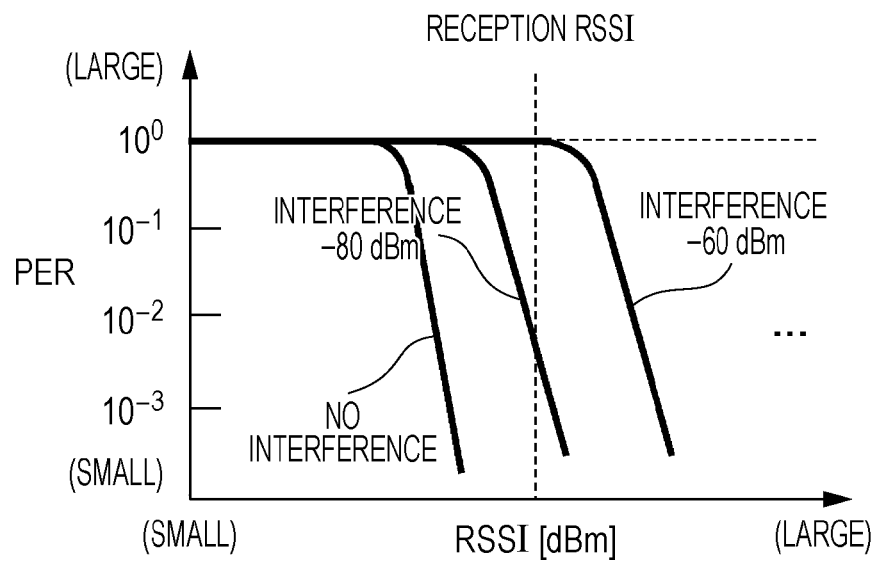

FIGS. 13A and 13B illustrate examples of propagation characteristics tables, which are stored in the propagation characteristics table memory 131, for the transmission rates of 1 Mbps and 11 Mbps. In FIGS. 13A and 13B, the horizontal axis indicates the RSSI (dBm), and the vertical axis indicates the PER. In FIGS. 13A and 13B, "Reception RSSI" represents the detected value of RSSI of the desiring signal wave.

In the case of wireless communication in accordance with the IEEE 802.11b standards, for example, since four transmission rates, i.e., 1 Mbps, 2 Mbps, 5.5 Mbps, and 11 Mbps, are specified in the IEEE 802.11b standards, the propagation characteristics table memory 131 stores the relation information for each of the four transmission rates.

For each of the plural transmission rates, the PER estimator 133 refers to the propagation characteristics table stored in the propagation characteristics table memory 131, and estimates, based on both the detected value of RSSI of the desiring signal wave and the detected value of the interfering wave power, the PER when the relevant transmission rate is used to transmit a signal from the transmitter 3 to the receiver 5. Then, the PER estimator 133 outputs the estimation value of the PER to the transmission rate selector 135 in fashion related to the transmission rate for which the PER has been estimated.

The transmission rate selector 135 compares the estimation values of the PER for the plural transmission rates with one another, which have been estimated by the PER estimator 133, and selects, as the post-change transmission rate, the transmission rate at which the estimation value of the PER is minimum.

Figure 14:
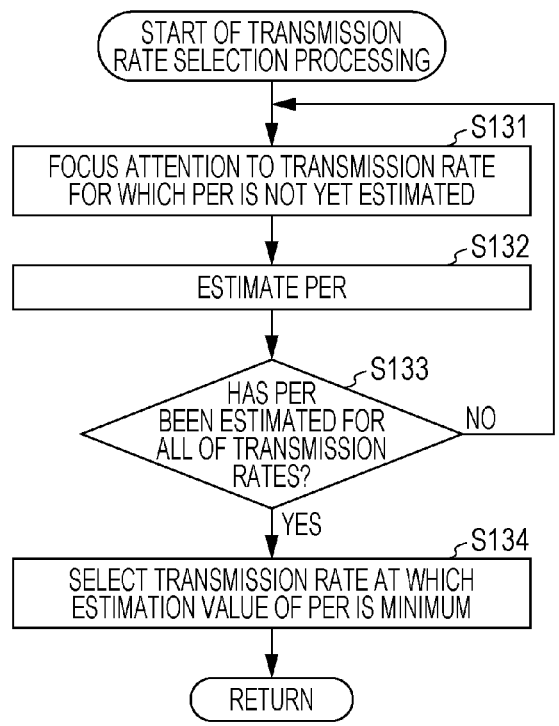
FIG. 14 is a flowchart of transmission rate selection processing executed by a transmission rate selection processor in FIG. 12.

The transmission rate selection processing executed by the transmission rate selection processor 56A in FIG. 12 will be described below with reference to FIG. 14. FIG. 14 is a flowchart of the transmission rate selection processing executed by the transmission rate selection processor 56A in FIG. 12.

The PER estimator 133 focuses attention to one of the plural transmission rates for which the PER is not yet estimated (step S131). Then, the PER estimator 133 refers to the propagation characteristics table stored in the propagation characteristics table memory 131 for the relevant transmission rate, and estimates the PER based on both the detected value of RSSI of the desiring signal wave and the detected value of the interfering wave power (step S132).

Thereafter, the PER estimator 133 determines whether the PER has been estimated for all of the plural transmission rates (step S133). If there is a transmission rate for which the PER is not yet estimated (S133: No), the processing returns to step S131. If the PER has been estimated for all of the plural transmission rates (S133: Yes), the processing advances to step S134.

The transmission rate selector 135 compares the estimation values of the PER for the plural transmission rates with one another, which have been estimated in steps S131 to S133, and selects, as the post-change transmission rate, the transmission rate at which the estimation value of the PER is minimum (step S134).

Third Embodiment

A third embodiment of the present disclosure will be described below with reference to the drawings.

A wireless communication system including a transmitter and a receiver, according to the third embodiment, is substantially the same as the wireless communication system including the transmitter and the receiver, according to the first embodiment, except for the transmission rate selection processing executed by the receiver, which has been described in the first embodiment.

Accordingly, in the third embodiment, the transmission rate selection processing executed by the receiver is described, and descriptions of the transmitter and the receiver, other than the transmission rate selection processing executed by the receiver, are omitted.

Figure 15:
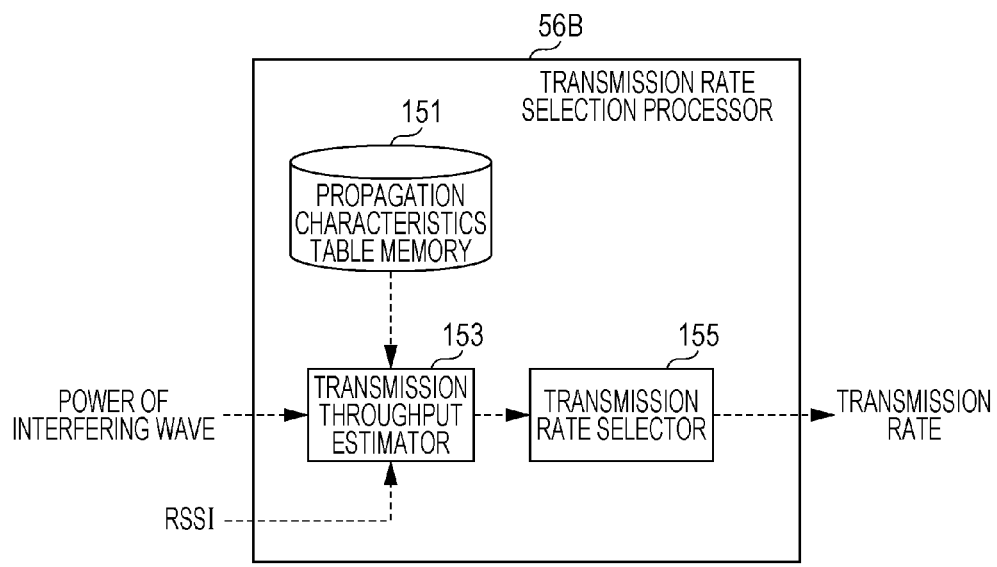
FIG. 15 is a block diagram illustrating the configuration of a transmission rate selection processor in a receiver according to a third embodiment.

First, the configuration of a transmission rate selection processor 56B in the receiver according to the third embodiment will be described below with reference to FIG. 15. FIG. 15 is a block diagram illustrating the configuration of the transmission rate selection processor 56B in the receiver according to the third embodiment.

As illustrated in FIG. 15, the transmission rate selection processor 56B includes a propagation characteristics table memory 151, a transmission throughput estimator 153, and a transmission rate selector 155.

The propagation characteristics table memory 151 stores, in a propagation characteristics table, relation information representing the relation among the RSSI of the desiring signal wave, the power of the interfering wave, and the transmission throughput for each of plural transmission rates. It is to be noted that the propagation characteristics table is prepared in advance.

Figure 16:
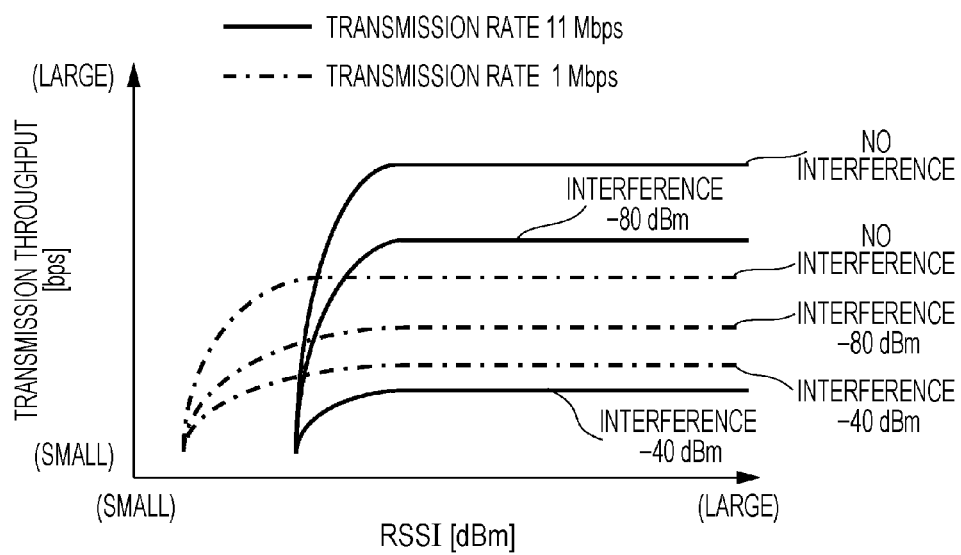
FIG. 16 illustrates examples of a propagation characteristics table that is stored in a propagation characteristics table memory in FIG. 15.

FIG. 16 illustrates examples of propagation characteristics tables, which are stored in the propagation characteristics table memory 151, for the transmission rates of 1 Mbps and 11 Mbps. In FIG. 16, the horizontal axis indicates the RSSI (dBm), and the vertical axis indicates the transmission throughput (bps).

In the case of wireless communication in accordance with the IEEE 802.11b standards, for example, since four transmission rates, i.e., 1 Mbps, 2 Mbps, 5.5 Mbps, and 11 Mbps, are specified in the IEEE 802.11b standards, the propagation characteristics table memory 151 stores the relation information for each of the four transmission rates.

For each of the plural transmission rates, the transmission throughput estimator 153 refers to the propagation characteristics table stored in the propagation characteristics table memory 151, and estimates, based on both the detected value of RSSI of the desiring signal wave and the detected value of the interfering wave power, the transmission throughput when the relevant transmission rate is used to transmit a signal from the transmitter 3 to the receiver 5. Then, the transmission throughput estimator 153 outputs the estimation value of the transmission throughput to the transmission rate selector 155 in fashion related to the transmission rate for which the transmission throughput has been estimated.

The transmission rate selector 155 compares the estimation values of the transmission throughput for the plural transmission rates with one another, which have been estimated by the transmission throughput estimator 153, and selects, as the post-change transmission rate, the transmission rate at which the estimation value of the transmission throughput is maximum.

Figure 17:
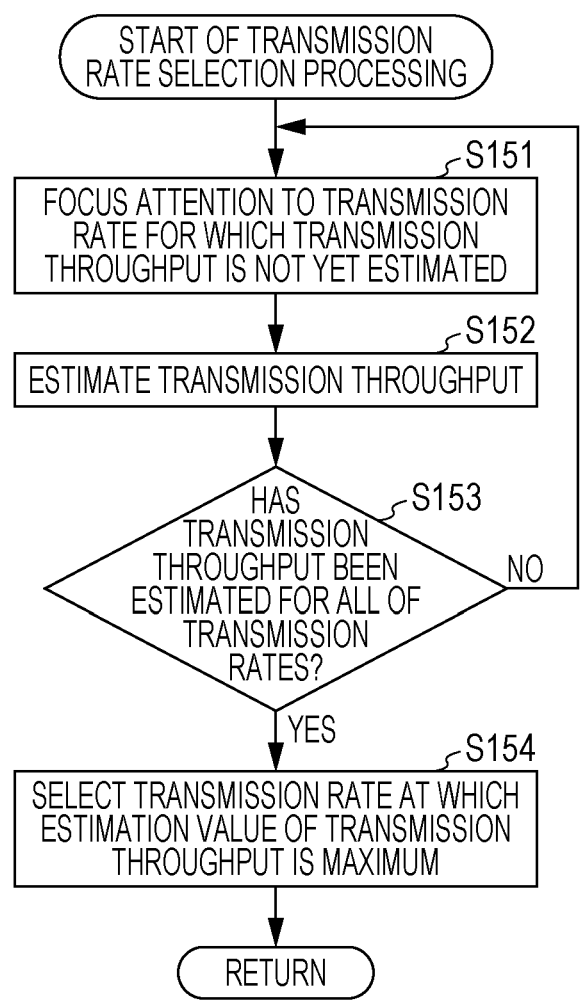
FIG. 17 is a flowchart of transmission rate selection processing executed by a transmission rate selection processor in FIG. 15.

The transmission rate selection processing executed by the transmission rate selection processor 56B in FIG. 15 will be described below with reference to FIG. 17. FIG. 17 is a flowchart of the transmission rate selection processing executed by the transmission rate selection processor 56B in FIG. 15.

The transmission throughput estimator 153 focuses attention to one of the plural transmission rates for which the transmission throughput is not yet estimated (step S151). Then, the transmission throughput estimator 153 refers to the propagation characteristics table stored in the propagation characteristics table memory 151 for the relevant transmission rate, and estimates the transmission throughput based on both the detected value of RSSI of the desiring signal wave and the detected value of the interfering wave power (step S152).

Thereafter, the transmission throughput estimator 153 determines whether the transmission throughput has been estimated for all of the plural transmission rates (step S153). If there is a transmission rate for which the transmission throughput is not yet estimated (S153: No), the processing returns to step S151. If the transmission throughput has been estimated for all of the plural transmission rates (S153: Yes), the processing advances to step S154.

The transmission rate selector 155 compares the estimation values of the transmission throughput for the plural transmission rates with one another, which have been estimated in steps S151 to S153, and selects, as the post-change transmission rate, the transmission rate at which the estimation value of the transmission throughput is maximum (step S154).

Fourth Embodiment

A fourth embodiment of the present disclosure will be described below with reference to the drawings. Components in the fourth embodiment, which execute processing substantially in the same manner as the components in the second and third embodiments, are denoted by the same reference symbols. Because descriptions of those components in the second and third embodiments can be applied to the fourth embodiment, the descriptions of those components are omitted here.

A wireless communication system including a transmitter and a receiver, according to the fourth embodiment, is substantially the same as the wireless communication system including the transmitter and the receiver, according to the first embodiment, except for the transmission rate selection processing executed by the receiver, which has been described in the first embodiment.

Accordingly, in the fourth embodiment, the transmission rate selection processing executed by the receiver is described, and descriptions of the transmitter and the receiver, other than the transmission rate selection processing executed by the receiver, are omitted.

Figure 18:
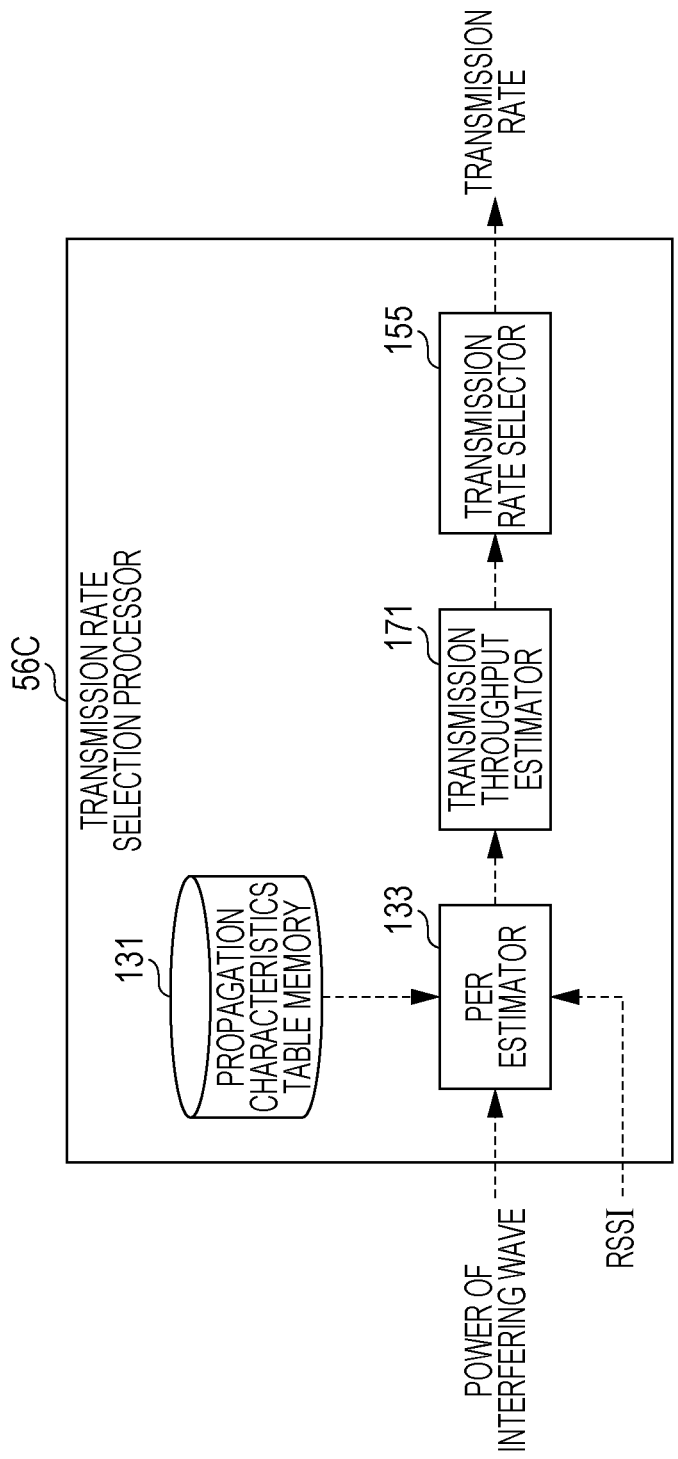
FIG. 18 is a block diagram illustrating the configuration of a transmission rate selection processor in a receiver according to a fourth embodiment.

First, the configuration of a transmission rate selection processor 56C in the receiver according to the fourth embodiment will be described below with reference to FIG. 18. FIG. 18 is a block diagram illustrating the configuration of the transmission rate selection processor 56C in the receiver according to the fourth embodiment.

As illustrated in FIG. 18, the transmission rate selection processor 56C includes a propagation characteristics table memory 131, a PER estimator 133, a transmission throughput estimator 171, and a transmission rate selector 155.

For each of the plural transmission rates, the transmission throughput estimator 171 calculates, based on the estimation value of the PER estimated by the PER estimator 133, the transmission throughput that can be realized at the MAC layer level when the relevant transmission rate is used to transmit a signal from the transmitter 3 to the receiver 5. Then, the transmission throughput estimator 171 outputs the estimation value of the transmission throughput to the transmission rate selector 155 in fashion related to the transmission rate for which the transmission throughput has been estimated.

One example of a method for calculating a transmission throughput by employing a Surplus Bandwidth Allowance (or Surplus), specified in IEEE 802.11e Draft13.0, will be described below. The term "Surplus Bandwidth Allowance" implies a ratio of a band, which is to be secured for a transmission stream in consideration of retransmission, etc., to a standard band, and it is in no way smaller than 1.

Figure 19:
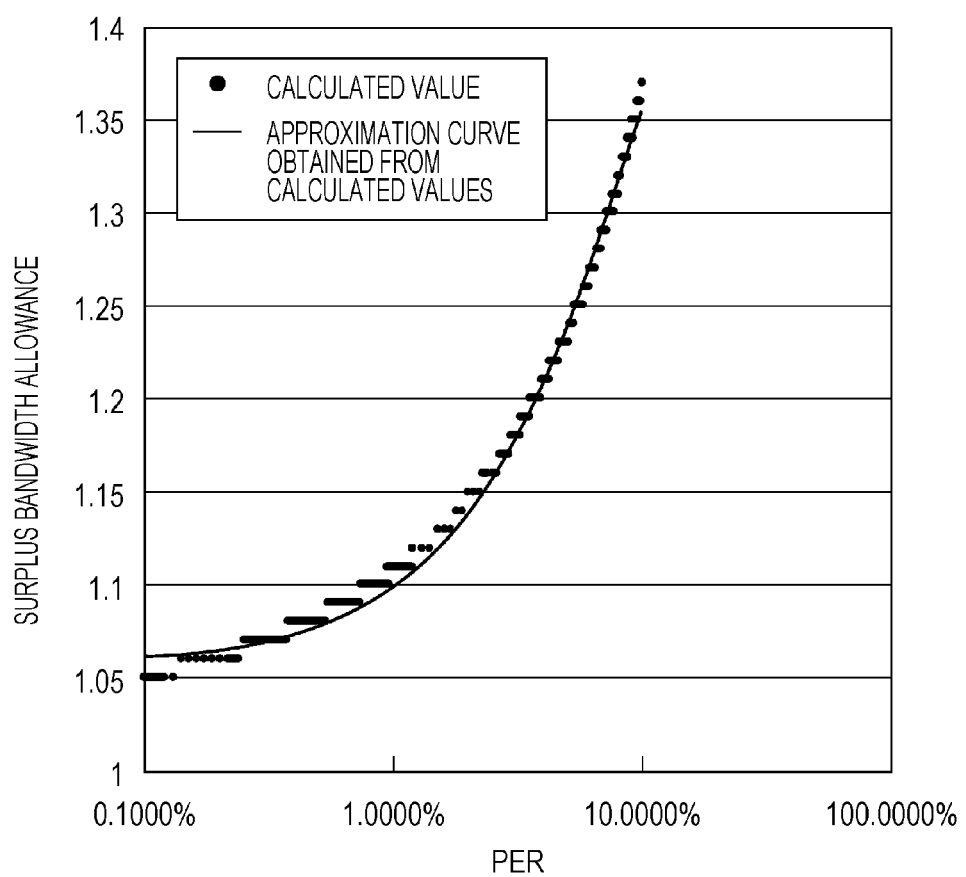
FIG. 19 illustrates one example of relation between a PER (Packet Error Rate) and a retransmission rate, the relation being used by a transmission rate selection processor in FIG. 18 to estimate a transmission throughput.

The transmission throughput estimator 171 calculates the Surplus Bandwidth Allowance based on the estimation value of the PER, which is input from the PER estimator 133. The relation between the PER and the Surplus Bandwidth Allowance, one example of which is depicted in FIG. 19, is used to calculate the Surplus Bandwidth Allowance. The relation between the PER and the Surplus Bandwidth Allowance can be determined by employing the following formula (1) that is specified in IEEE 802.11e Draft13.0. The following formula (1) is a relational expression enabling a redundant packet number S in consideration of retransmission when hundred frames are transmitted:

$$P_{drop} = \sum_{k=S+1}^{S+100} {}_{S+100}C_k p^k (1-p)^{100+S-k} \quad (1)$$

where p denotes the PER, and $P_{drop}$ denotes a packet loss rate representing a rate of packets at which hundred packets could not be received among a number (100+S) of packets.

FIG. 19 depicts the result of determining the redundant packet number S by employing the above formula (1) on condition the packet loss rate is held at $10^{-8}$ or less at each value of the PER. In FIG. 19, the horizontal axis indicates the PER, and the horizontal axis indicates the Surplus Bandwidth Allowance (=(100+S)/100). In FIG. 19, a black circle represents a value calculated using the above formula (1), and a solid line represents an approximation curve determined from the black circles. For example, in the case where the content rate is 10 Mbps and a value of the Surplus Bandwidth Allowance is 1.25, a band of at least 12.5 Mbps is required for transmission of contents.

The packet loss rate is fixedly set to $10^{-8}$ in order not to generate a loss of even one packet when viewing video for about two hours (corresponding to the number of transmitted frames being about $1.65^{-7}$) with the BS digital broadcasting and the full TS recording at 28 Mbps, which is a maximum content rate among conceivable contents. While the packet number is assumed to be 100 in the calculation using the above formula (1), the packet number may be changed depending on the size of a transmission buffer in the transmitter or the size of a reception buffer in the receiver.

The transmission throughput estimator 171 puts the estimation value of the PER, which is input from the PER estimator 133, in p of the above formula (1), and calculates the redundant packet number S at which the packet loss rate $P_{drop}$ is held at $10^{-8}$ or less. Then, the transmission throughput estimator 171 puts the calculated packet number S in (100+S)/100, and calculates the Surplus Bandwidth Allowance. Furthermore, the transmission throughput estimator 171 calculates the transmission throughput from the calculated Surplus Bandwidth Allowance.

The calculation of the transmission throughput is performed as follows, for example, in the case where the transmission rate is 48 Mbps in accordance with IEEE 802.11a and the calculated Surplus Bandwidth Allowance is 1.25. First, when the transmission rate is 48 Mbps, a maximum effective rate at the MAC layer level is about 32 Mbps. This value is a maximum effective rate calculated on condition that packets are transmitted in accordance with HCCA (HCF Controlled Channel Access) of IEEE 802.11e, taking into consideration a preamble of the frame, a header of the Physical Layer, a MAC header, SIFS (Short Inter Frame Space), and an ACK frame. The transmission throughput is obtained by dividing the calculated maximum effective rate by the Surplus Bandwidth Allowance. Therefore, the transmission throughput is obtained as 32000000 (bps)/1.25=2560000 (bps) in this case. In other words, because of the Surplus Bandwidth Allowance being 1.25, when the transmission rate is 48 Mbps, the transmission throughput in consideration of retransmission can be calculated as 25.6 Mbps.

Figure 20:
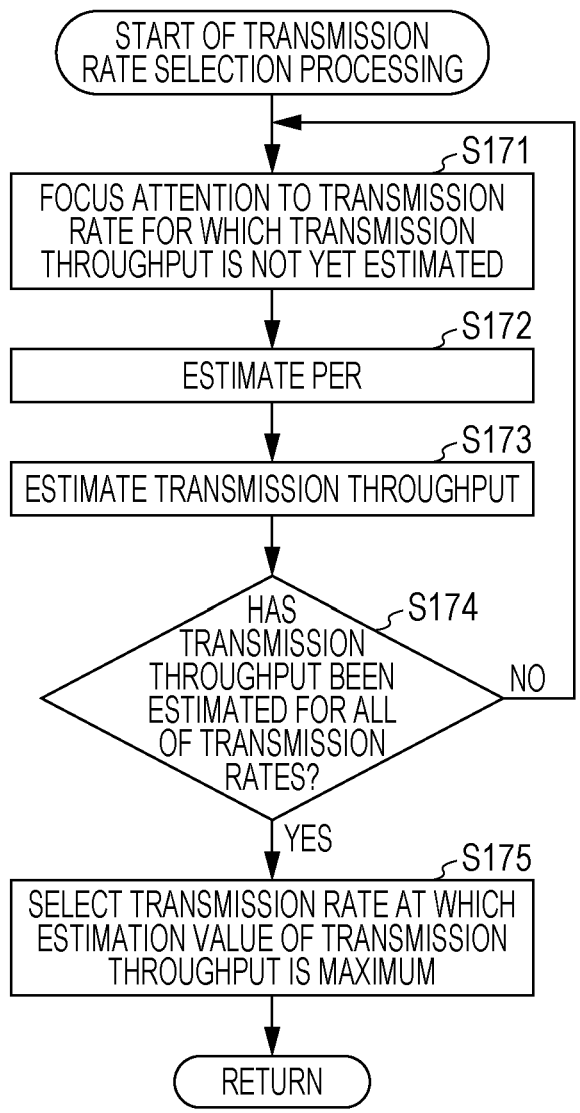
FIG. 20 is a flowchart of transmission rate selection processing executed by the transmission rate selection processor in FIG. 18.

The transmission rate selection processing executed by the transmission rate selection processor 56C in FIG. 18 will be described below with reference to FIG. 20. FIG. 20 is a flowchart of the transmission rate selection processing executed by the transmission rate selection processor 56C in FIG. 18.

The PER estimator 133 focuses attention to one of the plural transmission rates for which the transmission throughput is not yet estimated (step S171). Then, the PER estimator 133 refers to the propagation characteristics table stored in the propagation characteristics table memory 131 for the relevant transmission rate, and estimates the PER based on both the detected value of RSSI of the desiring signal wave and the detected value of the interfering wave power (step S172). Then, the transmission throughput estimator 171 estimates the transmission throughput from the estimation value of the PER (step S173), which has been estimated in step S172.

The transmission throughput estimator 171 determines whether the transmission throughput has been estimated for all of the plural transmission rates (step S174). If there is a transmission rate for which the transmission throughput is not yet estimated (S174: No), the processing returns to step S171. If the transmission throughput has been estimated for all of the plural transmission rates (S174: Yes), the processing advances to processing in step S175.

The transmission rate selector 155 compares the estimation values of the transmission throughput for the plural transmission rates with one another, which have been estimated in steps S171 to S174, and selects, as the post-change transmission rate, the transmission rate at which the estimation value of the transmission throughput is maximum (step S175).

Fifth Embodiment

A fifth embodiment of the present disclosure will be described below with reference to the drawings. Components in the fifth embodiment, which execute processing substantially in the same manner as the components in the first to fourth embodiments, are denoted by the same reference symbols. Because descriptions of those components in the first to fourth embodiments can be applied to the fifth embodiment, the descriptions of those components are omitted here.

In the first to fourth embodiments, the receiver selects the post-change transmission rate from among the plural transmission rates based on both the detected value of RSSI of the desiring signal wave and the detected value of the interfering wave power, and then notifies the selected post-change transmission rate to the transmitter.

On the other hand, in the fifth embodiment the receiver 5 detects the interfering wave power and notifies the detected value of the interfering wave power to the transmitter. The transmitter selects the post-change transmission rate from among the plural transmission rates based on both the detected value of RSSI of the desiring signal wave and the detected value of the interfering wave power, the latter being notified from the receiver.

The configuration and the operation of a wireless communication system according to the fifth embodiment will be first described with reference to FIGS. 21 and 22. FIG. 2.1 is a block diagram illustrating the configuration of the wireless communication system according to the fifth embodiment, and FIG. 22 is a sequence chart illustrating one example of the operation of the wireless communication system of FIG. 21.

Figure 21:
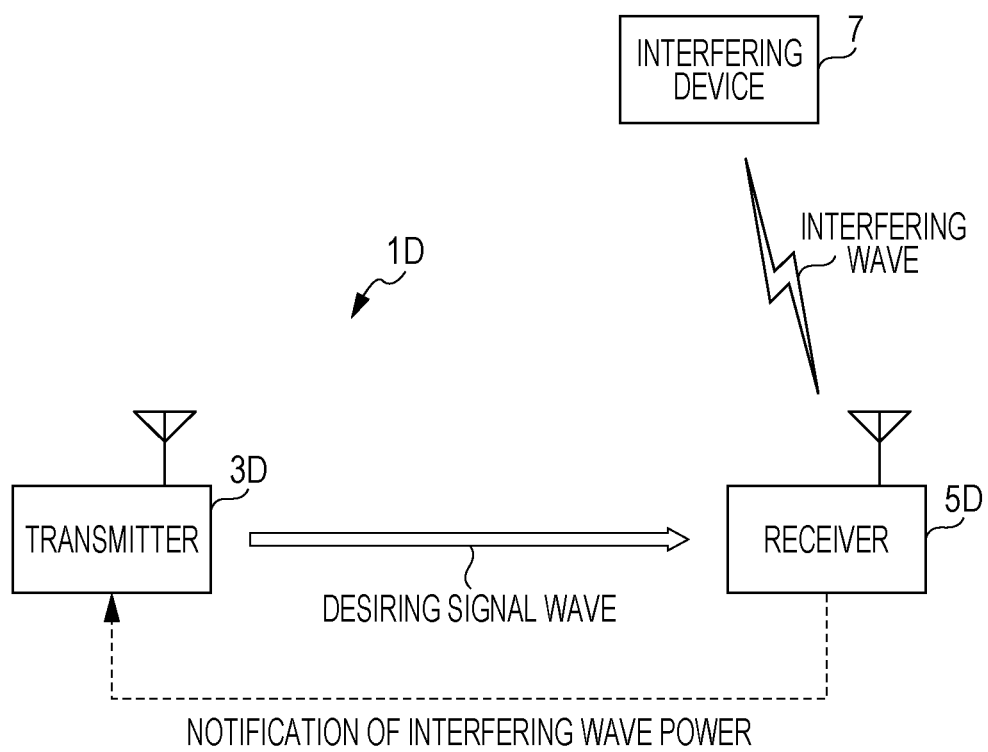
FIG. 21 is a block diagram illustrating the system configuration of a wireless communication system according to a fifth embodiment.

As illustrated in FIG. 21, a wireless communication system 1D includes, as wireless communication devices, a transmitter 3D and a receiver 5D. The wireless communication system 1D may further include, in addition to the transmitter 3D and the receiver 5D, one or plural wireless communication devices in some cases.

Figure 22:
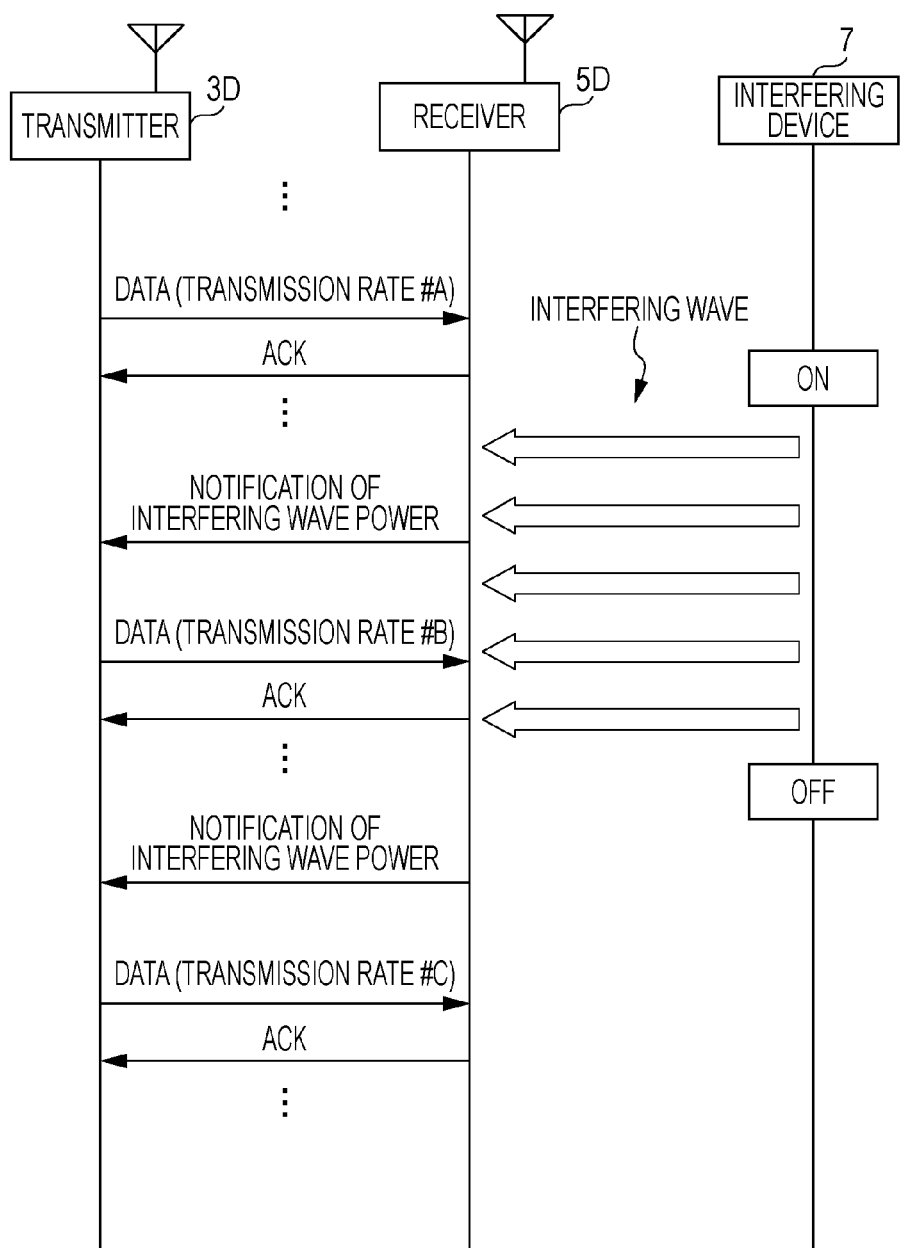
FIG. 22 is a sequence chart illustrating one example of the operation of the wireless communication system of FIG. 21.

As illustrated in FIG. 22, the transmitter 3D transmits a data signal to the receiver 5D by employing a transmission rate #A (e.g., an initially set transmission rate or a post-change transmission rate previously selected by the transmitter 3D based on the detected value of the interfering wave power, which has been received by the transmitter 3D from the receiver 5D).

The receiver 5D receives the data signal transmitted to the receiver 5D. Then, the receiver 5D sends an ACK signal to the transmitter 3D, and the transmitter 3D receives the ACK signal sent to the transmitter 3D.

The operation switch of the interfering device 7 is turned on, and radiant noise is generated from the interfering device 7.

The radiant noise is generated as a wave interfering with the receiver 5D. The receiver 5D detects start of generation of the interfering wave and power of the interfering wave. The receiver 5D sends an interfering wave power notification signal, including the detected value of the interfering wave power, to the transmitter 3D.

The transmitter 3D receives the interfering wave power notification signal transmitted from the receiver 5D, and detects the RSSI of a signal wave (one example of the desiring signal wave) related to the interfering wave power notification signal. Thereafter, the transmitter 3D selects, as a transmission rate (i.e., a post-change transmission rate) to be newly used in signal transmission from the transmitter 3D to the receiver 5D, a transmission rate #B from among a plurality of transmission rates based on both the detected value of RSSI of the desiring signal wave and the detected value of the interfering wave power, the latter being received from the receiver 5D. The transmitter 3D then changes the transmission rate, which is to be used in signal transmission from the transmitter 3D to the receiver 5D, to the transmission rate #B.

In this respect, the transmitter 3D executes the transmission rate selection process by regarding the detected value of RSSI of the desiring signal wave, which has been sent from the receiver 5D to the transmitter 3D, as the detected value of RSSI of the desiring signal wave transmitted from the transmitter 3D to the receiver 5D.

The transmitter 3D transmits a data signal to the receiver 5D by employing the transmission rate #B after the change.

The receiver 5D receives the data signal transmitted to the receiver 5D. Then, the receiver 5D sends an ACK signal to the transmitter 3D, and the transmitter 3D receives the ACK signal sent to the transmitter 3D.

The operation switch of the interfering device 7 is turned off, and the generation of the radiant noise from the interfering device 7 is ceased.

The receiver 5D detects the end of generation of the interfering wave and the power of the interfering wave (at this time, the detected value of the interfering wave is given as a value of noise power around the receiver 5D when neither the signal wave nor the interfering wave reaches the receiver 5D). The receiver 5D sends an interfering wave power notification signal, including the detected value of the interfering wave power, to the transmitter 3D.

The transmitter 3D receives the interfering wave power notification signal sent from the receiver 5D, and detects the RSSI of a signal wave (one example of the desiring signal wave) related to the interfering wave power notification signal. Thereafter, the transmitter 3D selects, as a transmission rate (i.e., a post-change transmission rate) to be newly used in signal transmission from the transmitter 3D to the receiver 5D, a transmission rate #C from among the plural transmission rates based on both the detected value of RSSI of the desiring signal wave and the detected value of the interfering wave power, the latter being received from the receiver 5D. The transmitter 3D then changes the transmission rate, which is to be used in signal transmission from the transmitter 3D to the receiver 5D, to the transmission rate #C.

The transmitter 3D transmits a data signal to the receiver 5D by employing the transmission rate #C after the change.

The receiver 5D receives the data signal transmitted to the receiver 5D. Then, the receiver 5D sends an ACK signal to the transmitter 3D, and the transmitter 3D receives the ACK signal sent to the transmitter 3D.

Figure 23:
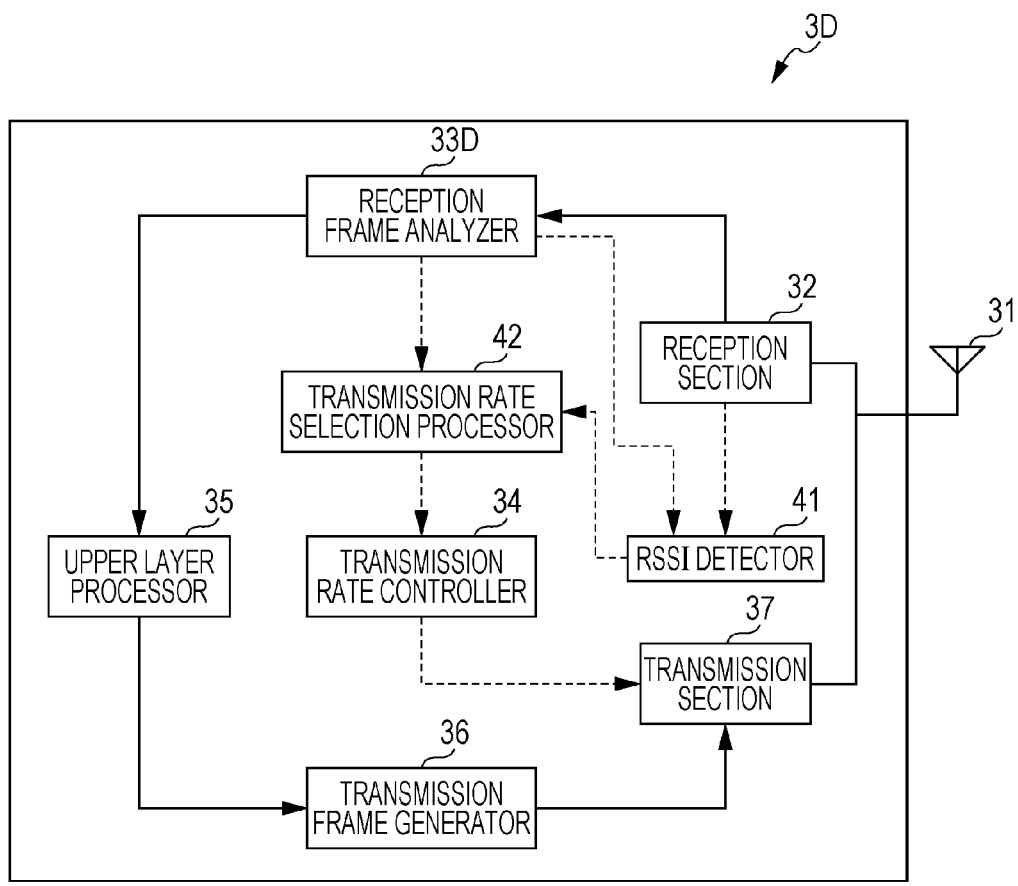
FIG. 23 is a block diagram illustrating the configuration of a transmitter in FIG. 21.

The configuration of the transmitter 3D in FIG. 21 will be described below with reference to FIG. 23. FIG. 23 is a block diagram illustrating the configuration of the transmitter 3D in FIG. 21.

As illustrated in FIG. 23, the transmitter 3D includes the transmission/reception antenna 31, the reception section 32, a reception frame analyzer 33D, an RSSI detector 41, a transmission rate selection processor 42, the transmission rate controller 34, the upper layer processor 35, the transmission frame generator 36, and the transmission section 37.

The reception frame analyzer 33D has the function of mainly executing processing in the MAC layer, e.g., the function of analyzing the contents of a MAC header of a reception frame. In the fifth embodiment, when the reception frame is an interfering wave power notification frame destined for the relevant transmitter 3D, the reception frame analyzer 33D extracts the detected value of the interfering wave power from the interfering wave power notification frame, and outputs the thus-extracted detected value of the interfering wave power to the transmission rate selection processor 42 together with a MAC address of a transmission source of the interfering wave power notification frame. Moreover, the reception frame analyzer 33D outputs, to the RSSI detector 41, a notice indicating that the interfering wave power notification frame destined for the relevant transmitter 3D has been received.

The interfering wave power notification frame is a newly specified frame that is not specified in the IEEE 802.11 standards.

The interfering wave power notification frame includes a MAC header, a frame body, and an FCS. The MAC header of the interfering wave power notification frame includes not only a transmission source address (MAC address of the transmission source) and a destination address (MAC address of the destination), but also a type value and a subtype value, which are assigned to the interfering wave power notification frame. The frame body includes information representing the detected value of the interfering wave power (i.e., interfering wave power information).

The RSSI detector 41 has the function of executing processing to detect the RSSI (Received Signal Strength Indicator) of a signal wave. When the RSSI detector 41 receives, from the reception frame analyzer 33D, a notice indicating that the reception frame is the interfering wave power notification frame destined for the relevant transmitter 3D, the RSSI detector 41 outputs the detected value of RSSI of the signal wave (desiring signal wave), related to the relevant reception frame, to the transmission rate selection processor 42. The transmission rate selection processor 42 selects the post-change transmission rate from among the plural transmission rates based on both the detected value of RSSI of the desiring signal wave, which has been detected by the RSSI detector 41, and the detected value of the interfering wave power, which has been received from the reception frame analyzer 33D. Then, the transmission rate selection processor 42 outputs the selected post-change transmission rate to the transmission rate controller 34 together with the MAC address of the transmission source of the interfering wave power notification frame, which has been received from the reception frame analyzer 33D.

The transmission rate selection processor 42 executes transmission rate selection processing that is, for example, similar to the transmission rate selection processing executed in the transmission rate selection processors 56, 56A, 56B and 56C described above in the first to fourth embodiments except for replacing the detected value of RSSI of the desiring signal wave, obtained from the RSSI detector 54, with the detected value of RSSI of the desiring signal wave, obtained from the RSSI detector 41, and replacing the detected value of the interfering wave power, detected by the interfering wave detector 55, with the detected value of the interfering wave power, notified by the interfering wave power notification frame (i.e., the detected value of the interfering wave power, received from the reception frame analyzer 33D).

Figure 24:
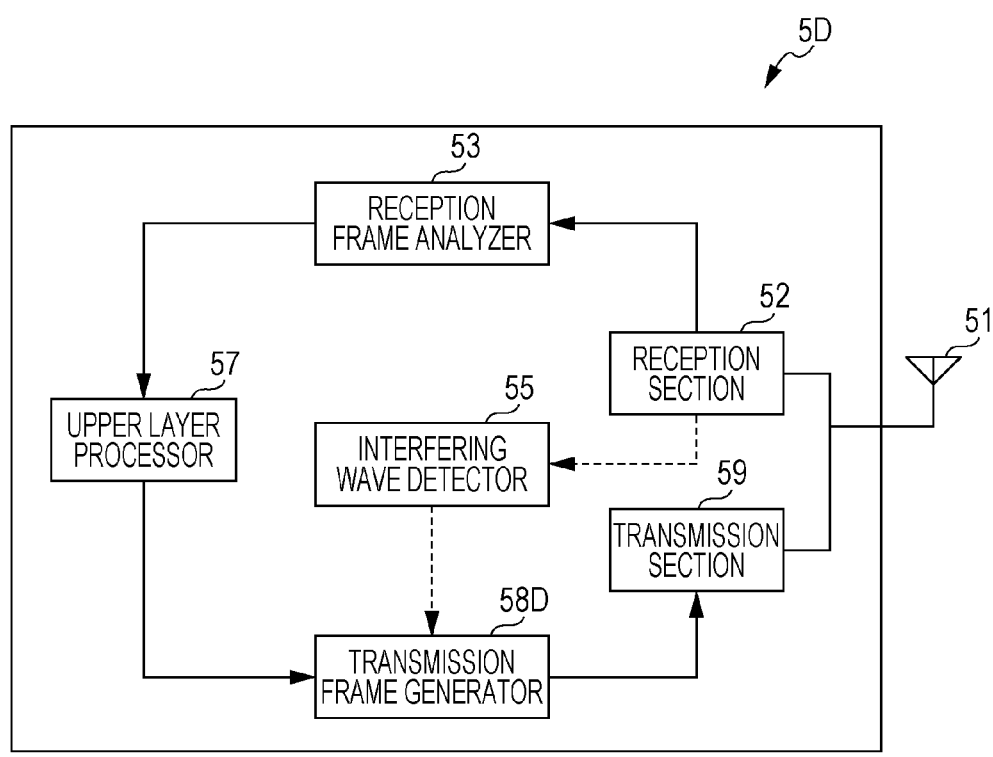
FIG. 24 is a block diagram illustrating the configuration of a receiver in FIG. 21.

The configuration of the receiver 5D in FIG. 21 will be described below with reference to FIG. 24. FIG. 24 is a block diagram illustrating the configuration of the receiver 5D in FIG. 21.

As illustrated in FIG. 24, the receiver 5D includes the transmission/reception antenna 51, the reception section 52, the reception frame analyzer 53, the interfering wave detector 55, the upper layer processor 57, a transmission frame generator 58D, and the transmission section 59.

The transmission frame generator 58D has the function of mainly executing processing in the MAC layer, such as generation of a transmission frame (including, e.g., a data frame, an ACK frame, and an interfering wave power notification frame). In the fifth embodiment, when the transmission frame generator 58D receives the detected value of the interfering wave power from the interfering wave power detector 55, it generates the interfering wave power notification frame. A MAC header of the interfering wave power notification frame contains the MAC address of the receiver 5D as a transmission source address, the MAC address of the communication party device (e.g., the address of a transmission source of the data frame received immediately before) as a destination address, and the values, which have been assigned to the interfering wave power notification frame, as a type value and a subtype value. A frame body of the interfering wave power notification frame contains the detected value of the interfering wave power, which has been transferred from the interfering wave detector 55.

Figure 25:
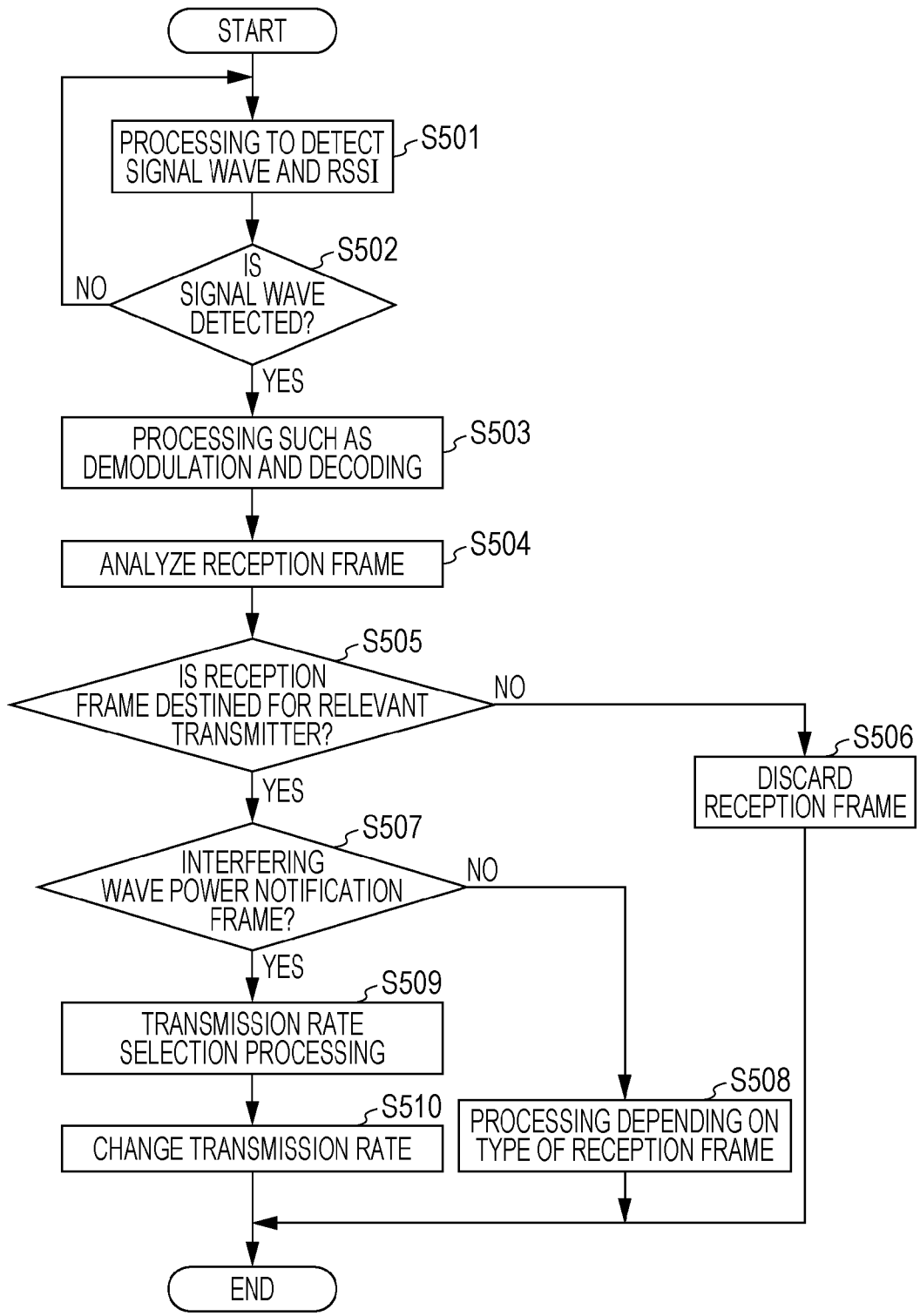
FIG. 25 is a flowchart of reception processing, including transmission rate selection and change processing, executed by the transmitter in FIG. 23.

Reception processing, including processing to select and change the transmission rate, executed by the transmitter 3D in FIG. 23 will be described below with reference to FIG. 25. FIG. 25 is a flowchart of the reception processing, including the transmission rate selection and change processing, executed by the transmitter 3D in FIG. 23.

The reception section 32 of the transmitter 3D executes processing to detect a signal wave sent from any of wireless communication devices, including the receiver 5D, and the RSSI detector 41 executes processing to detect the RSSI of the relevant signal wave (step S501). Until the signal wave is detected in the signal wave detection processing in step S501 (in case of S502: No), the reception section 32 continuously executes the processing to detect the signal wave in step S501 and the RSSI detector 41 continuously executes the processing to detect the RSSI of the signal wave in step S501. If the signal wave is detected (S502: Yes), the reception section 32 executes predetermined processing, such as demodulation and decoding, on the detected signal wave (step S503), and the reception frame analyzer 33D analyzes the contents of a MAC header of a reception frame (step S504).

The reception frame analyzer 33D determines, based on a destination address in the MAC header of the reception frame, whether the reception frame is a MAC frame destined for the relevant transmitter 3D (step S505). If the reception frame is not the MAC frame destined for the relevant transmitter 3D (S505: No), the reception frame analyzer 33D discards the reception frame (step S506).

On the other hand, if the reception frame is the MAC frame destined for the relevant transmitter 3D (S505: Yes), the reception frame analyzer 33D determines, based on a type value and a subtype value in the MAC header, whether the reception frame is the interfering wave power notification frame (step S507). If the reception frame is not the interfering wave power notification frame (step S507: No), the transmitter 3D executes processing depending on the type of the reception frame (step S508).

On the other hand, if the reception frame is the interfering wave power notification frame (S507: Yes), the reception frame analyzer 33D extracts the detected value of the interfering wave power from the interfering wave power notification frame. Then, the transmission rate selection processor 42 selects the post-change transmission rate from among the plural transmission rates (step S509) based on both the detected value (having been detected in step S501) of RSSI of the signal wave related to the interfering wave power notification frame and the detected value of the interfering wave power, which has been extracted by the reception frame analyzer 33D. The transmission rate controller 34 controls the transmission section 37 (step S510) such that the transmission rate used to transmit a signal from the relevant transmitter 3D to the device, which is the transmission source of the interfering wave power notification frame, is changed to the post-change transmission rate that has been selected in step S509.

One example of the transmission processing executed by the transmitter 3D is as per described above with reference to the flowchart of FIG. 8.

Reception processing executed by the receiver 5D in FIG. 24 will be described below with reference to FIG. 26. FIG. 26 is a flowchart of the reception processing executed by the receiver 5D in FIG. 24. It is to be noted that the flowchart of FIG. 26 represents a processing flow when the receiver 5D receives one signal.

The reception section 52 of the receiver 5D executes processing to detect a signal wave, which has been transmitted by any of wireless communication devices, including the transmitter 3D (step S601). Until the signal wave is detected in the signal wave detection processing in step S601 (in case of S602: No), the reception section 52 continuously executes the processing to detect the signal wave in step S601. If the signal wave is detected (S602: Yes), the reception section 52 executes predetermined processing, such as demodulation and decoding, on the detected signal wave (step S603), and the reception frame analyzer 53 analyzes the contents of a MAC header of a reception frame (step S604).

The reception frame analyzer 53 determines, based on a destination address in the MAC header of the reception frame, whether the reception frame is a MAC frame destined for the relevant receiver 5D (step S605). If the reception frame is not the MAC frame destined for the relevant receiver 5D (S605: No), the reception frame analyzer 53 discards the reception frame (step S606).

On the other hand, if the reception frame is the MAC frame destined for the relevant receiver 5D (S605: Yes), the receiver 5D executes processing, e.g., reply of an ACK signal, depending on the type of the reception frame (step S607).

A process, including processing to detect and notify the interfering wave power, executed by the receiver 5D in FIG. 24 will be described below with reference to FIG. 27. FIG. 27 is a flowchart of the interfering-wave power detection and notification processing executed by the receiver 5D in FIG. 24. It is to be noted that the flowchart of FIG. 27 represents a processing flow executed by the receiver 5D in relation to one operation of the interfering device 7.

The interfering wave detector 55 executes processing to detect an interfering wave and power of the interfering wave (step S701). Until the start of generation of the interfering wave is detected in step S701 (in case of S702: No), the interfering wave detector 55 continuously executes the processing to detect the interfering wave and the power of the interfering wave in step S701.

If the start of generation of the interfering wave is detected (S702: Yes), the transmission frame generator 58D generates an interfering wave power notification frame including the detected value of the interfering wave power that has been detected by the interfering wave detector 55 (in the processing of step S701). Then, the transmission section 59 executes predetermined processing, such as coding and modulation, on the generated interfering wave power notification frame, and sends a signal wave related to the interfering wave power notification frame from the transmission/reception antenna 51 (step S703).

The interfering wave detector 55 further executes the processing to detect the interfering wave and the power of the interfering wave (step S704). Until the end of generation of the interfering wave is detected in step S704 (in case of S705: No), the interfering wave detector 55 continuously executes the processing to detect the interfering wave and the power of the interfering wave in step S704.

If the end of generation of the interfering wave is detected (S705: Yes), the transmission frame generator 58D generates an interfering wave power notification frame including the detected value of the interfering wave power that has been detected by the interfering wave detector 55 (in the processing of step S704). Then, the transmission section 59 executes predetermined processing, such as coding and modulation, on the generated interfering wave power notification frame, and sends a signal wave related to the interfering wave power notification frame from the transmission/reception antenna 51 (step S706).

<Supplements (No. 1)>

The present disclosure is not limited to the matters described in the above-described embodiments. The present disclosure may be practiced in any modified forms insofar as the object of the present disclosure and other related or associated objects can be achieved. Examples of the modified forms are as follows.

(1) While, in the first to fourth embodiments described above, the transmission rate change notification frame is used to notify the post-change transmission rate from the receiver 5 to the transmitter 3, the present disclosure is not limited to that feature. Other suitable implements capable of notifying the post-change transmission rate from the receiver 5 to the transmitter 3 can also be used.

While, in the fifth embodiment described above, the interfering wave power notification frame is used to notify the detected value of the interfering wave power from the receiver 5 to the transmitter 3, the present disclosure is not limited to that feature. Other suitable implements capable of notifying the detected value of the interfering wave power from the receiver 5 to the transmitter 3 can also be used.

(2) While, in the fifth embodiment described above, the transmitter 3D detects the RSSI of the signal wave related to the interfering wave power notification frame and uses the detected value of the RSSI in the transmission rate selection processing, the present disclosure is not limited to that feature. For instance, the transmitter 3D may detect the RSSI of the signal wave related to the ACK frame destined for the transmitter 3D and received by it from the receiver 5D, and may use the detected value of the RSSI in the transmission rate selection processing. Such a modification is effective in the case where the desiring signal wave is affected by the interfering wave and the RSSI detection accuracy is reduced during generation of the interfering wave.

(3) While, in the first to fifth embodiments described above, the propagation characteristics tables are kept fixed, the present disclosure is not limited to that feature. For instance, the propagation characteristics tables may be modified in accordance with the communication result in actual operations.

More specifically, in FIG. 6, the contents of the propagation characteristics table are modified, for example, such that when the communication result of wireless communication using 5.5 Mbps as the transmission rate is good, the SIR value at which the transmission rate is changed over from 5.5 Mbps to 11 Mbps is set to be smaller, and when the communication result thereof is poor, the SIR value at which the transmission rate is changed over from 2 Mbps to 5 Mbps is set to be larger.

In FIG. 13, the contents of the propagation characteristics table are modified, for example, such that when the communication result of wireless communication using 1 Mbps as the transmission rate is good, the PER value corresponding to the RSSI is set to be smaller for 1 Mbps, and when the communication result thereof is poor, the PER value corresponding to the RSSI is set to be larger 1 Mbps.

In FIG. 16, the contents of the propagation characteristics table are modified, for example, such that when the communication result of wireless communication using 1 Mbps as the transmission rate is good, the value of transmission throughput corresponding to the RSSI is set to be larger for 1 Mbps, and when the communication result thereof is poor, the value of transmission throughput corresponding to the RSSI is set to be smaller for 1 Mbps.

With those modifications, the transmission rate can be more appropriately selected depending on installation environments in which the wireless communication system is installed.

(4) If the PER exceeds a preset threshold when the wireless communication is performed with respect to the transmitter, described above in each of the first to fifth embodiments, a predetermined number of times or for a predetermined period by employing the post-change transmission rate, the transmission rate for a signal transmitted from the transmitter to the receiver may be changed at the time of retransmission, for example.

In such a case, the transmission rate used to transmit a signal from the transmitter to the receiver may be changed, for example, to the transmission rate having a lower rate by one step in the first embodiment, to the transmission rate having a larger estimation value of the PEF by one step in the second embodiment, and to the transmission rate having a smaller estimation value of the transmission throughput by one step in the third and fourth embodiments.

(5) In the first to fifth embodiments, when the receiver 5 or the receiver 5D detects the end of generation of the interfering wave, the receiver 5 or the transmitter 3D executes the transmission rate selection process again by employing both the detected value of RSSI of the desiring signal wave and the detected value of the interfering wave power. However, the present disclosure is not limited to that feature, and the following processing is also conceivable, for example. The transmitter 3 or 3D holds the transmission rate before the start of generation of the interfering wave. When the end of generation of the interfering wave is detected, the receiver 5 or 5D instructs the transmitter 3 or 3D to return the transmission rate to that before the start of generation of the interfering wave. Upon receiving the instruction, the transmitter 3 or 3D returns the transmission rate to that before the start of generation of the interfering wave. Alternatively, the receiver 5 or 5D holds the transmission rate before the start of generation of the interfering wave. When the end of generation of the interfering wave is detected, the receiver 5 or 5D notifies, as the post-change transmission rate, the transmission rate before the start of generation of the interfering wave, which has been held so far, to the transmitter 3 or 3D. Upon receiving the notification, the transmitter 3 or 3D changes the transmission rate, which is used to transmit a signal from the transmitter 3 or 3D to the receiver 5 or 5D, to the post-change transmission rate.

(6) The scheme for selecting the transmission rate in the above-described first to fifth embodiment, etc. can be applied to not only the case in accordance with the IEEE 802.11 standards, such as IEEE 802.11b standards, but also to other cases where a plurality of transmission rates is usable for transmission from the transmitter to the receiver.

(7) Individual components of the transmitter and the receiver in the above-described first to fifth embodiments, etc. may be realized in the form of an integrated circuit called LSI (Large Scale Integration). On that occasion, the individual components may be separately integrated into respective chips, or some or the whole of the individual components may be integrated into one chip. While the term "LSI" is used above, there are various types of integrated circuits called an IC (Integrated Circuit), system LSI, super-LSI, and ultra-LSI depending on the scale of integration. The technique for forming the integrated circuit is not limited to the LSI, and the integrated circuit may be realized with a dedicated circuit or a universal processor. An FPGA (Field Programmable Gate Array) or a reconfigurable processor capable of reconfiguring connections and settings of circuit cells within the LSI may also be utilized. If a new circuit integration technique will be practiced in future instead of the LSI with development of the semiconductor technology or other derived technologies, functional blocks may of course be integrated by utilizing with the new circuit integration technique.

(8) At least a part of procedures of the operations of the transmitter and the receiver described above in the first to fifth embodiments, etc. may be written in a program, and a CPU (Central Processing Unit), for example, may read and execute the program stored in a memory. The program may be recorded on a recording medium and distributed, for example.

(9) The features described above in the first to fifth embodiments, etc. may be combined with each other as the occasion requires.

<Supplements (No. 2)>

The wireless communication system, the transmitter, and the receiver according to the embodiments, and advantageous effects thereof are summarized as follows.

(1) A first wireless communication system is a wireless communication system that performs wireless communication between a transmitter and a receiver, wherein the receiver includes a first detector that detects a Received Signal Strength Indicator of a desiring signal wave transmitted from the transmitter, a second detector that detects an interfering wave generated from an external device and power of the interfering wave, a transmission rate selection processor that selects a transmission rate, which is used to transmit a signal from the transmitter to the receiver, from among a plurality of transmission rates based on a detected value of the Received Signal Strength Indicator of the desiring signal wave and a detected value of the interfering wave power, when the second detector detects generation of the interfering wave, and a transmission rate notification unit that notifies, as a transmission rate used to transmit a signal from the transmitter to the receiver, the transmission rate selected by the transmission rate selection processor to the transmitter, and wherein the transmitter includes a transmission rate controller that changes the transmission rate, which is used to transmit a signal to the receiver, to the notified transmission rate, when the transmitter receives the notification of the transmission rate from the receiver.

With the first wireless communication system, in an environment where an interference source is present near the receiver, a transmission rate adapted for the environment around the receiver can be selected in a short time.

(2) According to a second wireless communication system, in the first wireless communication system, the transmission rate controller changes the transmission rate, which is used to transmit a signal to the receiver, based on a result of transmission from the transmitter to the receiver.

With the second wireless communication system, the following advantageous effect can be obtained. In consideration of that different transmission rates have different tolerance characteristics against interference, reception errors are reduced by transmitting a signal at suitable one of the plural transmission rates.

(3) A first receiver includes a wireless communication unit that performs wireless communication with a transmitter, a first detector that detects a Received Signal Strength Indicator of a desiring signal wave transmitted from the transmitter, a second detector that detects an interfering wave generated from an external device and power of the interfering wave, a transmission rate selection processor that selects a transmission rate, which is used to transmit a signal from the transmitter to the receiver, from among a plurality of transmission rates based on a detected value of the Received Signal Strength Indicator of the desiring signal wave and a detected value of the interfering wave power, when the second detector detects generation of the interfering wave, and a transmission rate notification unit that notifies, as a transmission rate used to transmit a signal from the transmitter to the receiver, the transmission rate selected by the transmission rate selection processor to the transmitter.

With the first receiver, in an environment where an interference source is present near the receiver, a transmission rate adapted for the environment around the receiver can be selected in a short time.

(4) According to a second receiver, in the first receiver, the transmission rate selection processor includes a memory that stores relation information representing relation between a ratio of the Received Signal Strength Indicator of the desiring signal wave to the power of the interfering wave and a transmission rate, a ratio calculator that calculates a ratio of the detected value of the Received Signal Strength Indicator of the desiring signal wave to the detected value of the interfering wave power, when the second detector detects generation of the interfering wave, and a transmission rate selector that selects a transmission rate, which is used to transmit a signal from the transmitter to the receiver, based on the relation information stored in the memory and a calculated value of the ratio.

With the second receiver, since the transmission rate is selected by utilizing the relation information representing the relation between the ratio of the Received Signal Strength Indicator of the desiring signal wave to the power of the interfering wave and the transmission rate, the transmission rate adapted for the environment around the receiver can be selected in a short time.

(5) According to a third receiver, in the first receiver, the transmission rate selection processor includes a memory that stores relation information representing, for each of the plural transmission rates, relation among the Received Signal Strength Indicator of the desiring signal wave, the power of the interfering wave, and a reception error rate, a reception error rate estimator that estimates, for each of the plural transmission rates, a reception error rate in case of employing each transmission rate to transmit a signal from the transmitter to the receiver based on the relation information stored in the memory, the detected value of the Received Signal Strength Indicator of the desiring signal wave, and the detected value of the interfering wave power, when the second detector detects generation of the interfering wave, and a transmission rate selector that selects, as a transmission rate used to transmit a signal from the transmitter to the receiver, one of the transmission rates for which an estimation value of the reception error rate estimated by the reception error rate estimator is minimum.

With the third receiver, since the transmission rate is selected by utilizing the relation information representing the relation among the Received Signal Strength Indicator of the desiring signal wave, the power of the interfering wave, and the reception error rate for each of the plural transmission rates, the transmission rate adapted for the environment around the receiver can be selected in a short time.

(6) According to a fourth receiver, in the first receiver, the transmission rate selection processor includes a memory that stores relation information representing, for each of the plural transmission rates, relation among the Received Signal Strength Indicator of the desiring signal wave, the power of the interfering wave, and a transmission throughput, a transmission throughput estimator that estimates, for each of the plural transmission rates, a transmission throughput in case of employing each transmission rate to transmit a signal from the transmitter to the receiver based on the relation information stored in the memory, the detected value of the Received Signal Strength Indicator of the desiring signal wave, and the detected value of the interfering wave power, when the second detector detects generation of the interfering wave, and a transmission rate selector that selects, as a transmission rate used to transmit a signal from the transmitter to the receiver, one of the transmission rates for which an estimation value of the transmission throughput estimated by the transmission throughput estimator is maximum.

With the fourth receiver, since the transmission rate is selected by utilizing the relation information representing the relation among the Received Signal Strength Indicator of the desiring signal wave, the power of the interfering wave, and the transmission throughput for each of the plural transmission rates, the transmission rate adapted for the environment around the receiver can be selected in a short time.

(7) According to a fifth receiver, in the first receiver, the transmission rate selection processor includes a memory that stores relation information representing, for each of the plural transmission rates, relation among the Received Signal Strength Indicator of the desiring signal wave, the power of the interfering wave, and a reception error rate, a reception error rate estimator that estimates, for each of the plural transmission rates, a reception error rate in case of employing each transmission rate to transmit a signal from the transmitter to the receiver based on the relation information stored in the memory, the detected value of the Received Signal Strength Indicator of the desiring signal wave, and the detected value of the interfering wave power, when the second detector detects generation of the interfering wave, a transmission throughput estimator that estimates, for each of the plural transmission rates, a transmission throughput based on an estimation value of the reception error rate estimated by the reception error rate estimator, and a transmission rate selector that selects, as a transmission rate used to transmit a signal from the transmitter to the receiver, one of the transmission rates for which the estimation value of the transmission throughput estimated by the transmission throughput estimator is maximum.

With the fifth receiver, since the transmission rate is selected by utilizing the relation information representing the relation among the Received Signal Strength Indicator of the desiring signal wave, the power of the interfering wave, and the reception error rate for each of the plural transmission rates, the transmission rate adapted for the environment around the receiver can be selected in a short time.

(8) According to a sixth receiver, in any of the first to fifth receivers, when, after detecting the generation of the interfering wave, the second detector comes into a state of no longer detecting the relevant interfering wave, the transmission rate selection processor selects, from among the plural transmission rates, a transmission rate used to transmit a signal.

With the sixth receiver, when the interfering wave is no longer present, the transmission rate adapted for the environment where the interfering wave is not present can be selected in a short time.

(9) According to a seventh receiver, in any of the first to fifth receivers, when, after detecting the generation of the interfering wave, the second detector comes into a state of no longer detecting the relevant interfering wave, the transmission rate notification unit notifies, to the transmitter, an instruction for return to the transmission rate before the detection of generation of the interfering wave, or notifies the transmission rate before the detection of generation of the interfering wave, as a transmission rate used to transmit a signal from the transmitter to the receiver, to the transmitter.

With the seventh receiver, when the interfering wave is no longer present, change to the transmission rate adapted for the environment where the interfering wave is not present can be executed in the transmitter in a short time.

(10) According to an eighth receiver, in any of the first to seventh receivers, the wireless communication is wireless communication stipulated in IEEE 802.11 standard specifications.

(11) According to a ninth receiver, in any of the first to eighth receivers, the plural transmission rates are plural transmission rates or MCS (Modulation and Coding Scheme) indexes stipulated in IEEE 802.11 standard specifications.

(12) According to a tenth receiver, in any of the first to ninth receivers, the second detector detects, as the interfering wave, radiant noise generated from the external device that is a microwave oven.

(13) A first transmission rate control method is a transmission rate control method executed in a receiver that performs wireless communication with a transmitter, the method including a first detection step of detecting a Received Signal Strength Indicator of a desiring signal wave transmitted from the transmitter, a second detection step of detecting an interfering wave generated from an external device and power of the interfering wave, a transmission rate selection processing step of selecting a transmission rate, which is used to transmit a signal from the transmitter to the receiver, from among a plurality of transmission rates based on a detected value of the Received Signal Strength Indicator of the desiring signal wave and a detected value of the interfering wave power, when generation of the interfering wave is detected in the second detection step, and a transmission rate notification step of notifying, as a transmission rate used to transmit a signal from the transmitter to the receiver, the transmission rate selected in the transmission rate selection processing step to the transmitter.

With the first transmission rate control method, in an environment where an interference source is present near the receiver, a transmission rate adapted for the environment around the receiver can be selected in a short time.

(14) A third wireless communication system is a wireless communication system that performs wireless communication between a transmitter and a receiver, wherein the receiver includes a first detector that detects an interfering wave generated from an external device and power of the interfering wave, and an interfering wave power notification unit that notifies a detected value of the interfering wave power to the transmitter when the first detector detects generation of the interfering wave, and wherein the transmitter includes a second detector that detects a Received Signal Strength Indicator of a desiring signal wave sent from the receiver, an interfering wave power reception unit that receives, from the receiver, the detected value of the interfering wave power detected by the receiver, a transmission rate selection processor that, when the interfering wave power reception unit receives the detected value of the interfering wave power from the receiver, selects a transmission rate, which is used to transmit a signal from the transmitter to the receiver, from among a plurality of transmission rates based on a detected value of the Received Signal Strength Indicator of the desiring signal wave and the detected value of the interfering wave power, and a transmission rate controller that changes the transmission rate, which is used to transmit a signal from the transmitter to the receiver, to the transmission rate selected by the transmission rate selection processor.

With the third wireless communication system, in an environment where an interference source is present near the receiver, a transmission rate adapted for the environment around the receiver can be selected in a short time.

(15) A first transmitter is a transmitter that performs wireless communication with a receiver, the transmitter including a detector that detects a Received Signal Strength Indicator of a desiring signal wave sent from the receiver, an interfering wave power reception unit that receives, from the receiver, a detected value of interfering wave power detected by the receiver, a transmission rate selection processor that, when the interfering wave power reception unit receives the detected value of the interfering wave power from the receiver, selects a transmission rate, which is used to transmit a signal from the transmitter to the receiver, from among a plurality of transmission rates based on a detected value of the Received Signal Strength Indicator of the desiring signal wave and the detected value of the interfering wave power, and a transmission rate controller that changes the transmission rate, which is used to transmit a signal from the transmitter to the receiver, to the transmission rate selected by the transmission rate selection processor.

With the first transmitter, in an environment where an interference source is present near the receiver, a transmission rate adapted for the environment around the receiver can be selected in a short time.

(16) A second transmission rate control method is a transmission rate control method executed in a transmitter that performs wireless communication with a receiver, the method including a detection step of detecting a Received Signal Strength Indicator of a desiring signal wave sent from the receiver, an interfering wave power reception step of receiving, from the receiver, a detected value of interfering wave power detected by the receiver, a transmission rate selection processing step of, when the detected value of the interfering wave power is received from the receiver in the interfering wave power reception step, selecting a transmission rate, which is used to transmit a signal from the transmitter to the receiver, from among a plurality of transmission rates based on a detected value of the Received Signal Strength Indicator of the desiring signal wave and the detected value of the interfering wave power, and a transmission rate control step of changing the transmission rate, which is used to transmit a signal from the transmitter to the receiver, to the transmission rate selected in the transmission rate selection processing step.

With the second transmission rate control method, in an environment where an interference source is present near the receiver, a transmission rate adapted for the environment around the receiver can be selected in a short time.

The present disclosure can be utilized in control of a transmission rate that is used to transmit a signal from a transmitter to a receiver in an environment where an interference device is present.

What is claimed is:
1. A wireless communication system comprising a transmitter and a receiver,
wherein the receiver comprises:
a first detector that detects a Received Signal Strength Indicator of a desiring signal wave transmitted from the transmitter;
a second detector that detects a power of an interfering wave generated by an external device;
a transmission rate selection processor that selects a transmission rate, which is used to transmit a signal from the transmitter to the receiver, from among a plurality of transmission rates based on the detected Received Signal Strength Indicator of the desiring signal wave and the detected power of the interfering wave, when the second detector detects the power of the interfering wave; and
a transmission rate notificator that notifies the transmitter of the transmission rate selected by the transmission rate selection processor; and
wherein the transmitter comprises:
a transmission rate controller that changes the transmission rate, which is used to transmit a signal to the receiver, to the notified transmission rate, when the transmitter receives the notification of the transmission rate from the receiver.

2. The wireless communication system of claim 1, wherein the transmission rate controller changes the transmission rate, which is used to transmit a signal to the receiver, based on a result of transmission from the transmitter to the receiver.

3. A receiver that receives a signal from a transmitter, wherein the transmitter changes a transmission rate, which is used to transmit a signal to the receiver, to a notified transmission rate, when the transmitter receives a notification of the transmission rate from the receiver;
the receiver comprising:
a first detector that detects a Received Signal Strength Indicator of a desiring signal wave transmitted from the transmitter;
a second detector that detects a power of an interfering wave generated by an external device;
a transmission rate selection processor that selects the transmission rate from among a plurality of transmission rates based on the detected Received Signal Strength Indicator of the desiring signal wave and the detected power of the interfering wave, when the second detector detects the power of the interfering wave; and
a transmission rate notificator that notifies the transmitter of the transmission rate selected by the transmission rate selection processor.

4. The receiver of claim 3, wherein the transmission rate selection processor comprises:
a relation information representing relation between a ratio of the Received Signal Strength Indicator of the desiring signal wave to the power of the interfering wave and a transmission rate;
a ratio calculator that calculates a ratio of the detected Received Signal Strength Indicator of the desiring signal wave to the detected power of the interfering wave, when the second detector detects generation of the interfering wave; and
a transmission rate selector that selects a transmission rate based on the relation information and the calculated ratio.

5. The receiver of claim 3, wherein the transmission rate selection processor comprises:
a relation information representing, for each of the plural transmission rates, relation among the Received Signal Strength Indicator of the desiring signal wave, the power of the interfering wave, and a reception error rate;
a reception error rate estimator that estimates, for each of the plural transmission rates, a reception error rate in case of employing each transmission rate to transmit a signal from the transmitter to the receiver based on the relation information, the detected Received Signal Strength Indicator of the desiring signal wave, and the detected power of the interfering wave, when the second detector detects generation of the interfering wave; and
a transmission rate selector that selects one of the transmission rates for which the reception error rate estimated by the reception error rate estimator is minimum.

6. The receiver of claim 3, wherein the transmission rate selection processor comprises:
a relation information representing, for each of the plural transmission rates, relation among the Received Signal Strength Indicator of the desiring signal wave, the power of the interfering wave, and a transmission throughput;
a transmission throughput estimator that estimates, for each of the plural transmission rates, a transmission throughput in case of employing each transmission rate to transmit a signal from the transmitter to the receiver based on the relation information, the detected Received Signal Strength Indicator of the desiring signal wave, and the detected power of the interfering, when the second detector detects generation of the interfering wave; and
a transmission rate selector that selects one of the transmission rates for which the transmission throughput estimated by the transmission throughput estimator is maximum.

7. The receiver of claim 3, wherein the transmission rate selection processor comprises:
a relation information representing, for each of the plural transmission rates, relation among the Received Signal Strength Indicator of the desiring signal wave, the power of the interfering wave, and a reception error rate;
a reception error rate estimator that estimates, for each of the plural transmission rates, a reception error rate in case of employing each transmission rate to transmit a signal from the transmitter to the receiver based on the relation information, the detected Received Signal Strength Indicator of the desiring signal wave, and the detected power of the interfering wave, when the second detector detects generation of the interfering wave;
a transmission throughput estimator that estimates, for each of the plural transmission rates, a transmission throughput based on the reception error rate estimated by the reception error rate estimator; and
a transmission rate selector that selects one of the transmission rates for which the transmission throughput estimated by the transmission throughput estimator is maximum.

8. The receiver of claim 3, wherein the transmission rate selection processor selects from among the plural transmission rates when the second detector comes into a state of no longer detecting the relevant interfering wave after detecting the generation of the interfering wave.

9. The receiver of claim 3, wherein the transmission rate notificator notifies the transmitter of an instruction for return to the transmission rate, or notifies the transmitter of the transmission rate before the detection of generation of the interfering wave, when the second detector comes into a state of no longer detecting the relevant interfering wave after detecting the generation of the interfering wave.

10. The receiver of claim 3, wherein the wireless communication is wireless communication stipulated in IEEE 802.11 standard specifications.

11. The receiver of claim 3, wherein the plural transmission rates are plural transmission rates or MCS (Modulation and Coding Scheme) indexes stipulated in IEEE 802.11 standard specifications.

12. The receiver of claim 3, wherein the second detector detects, as the interfering wave, radiant noise generated by the external device that is a microwave oven.

13. A transmission rate control method executed in a receiver that performs wireless communication with a transmitter, wherein the transmitter changes a transmission rate, which is used to transmit a signal to the receiver, to a notified transmission rate, when the transmitter receives a notification of the transmission rate from the receiver;
the method comprising:
detecting a Received Signal Strength Indicator of a desiring signal wave transmitted from the transmitter and a power of interfering wave generated by an external device;
selecting the transmission rate from among a plurality of transmission rates based on the detected Received Signal Strength Indicator of the desiring signal wave and the detected power of the interfering wave, when detecting the power of the interfering wave; and
notifying the transmitter of the selected transmission rate.

14. A wireless communication system comprising a transmitter and a receiver,
wherein the receiver comprises:
a first detector that detects a power of interfering wave generated by an external device; and
an interfering wave power notificator that notifies the transmitter of a detected power of the interfering wave when the first detector detects generation of the interfering wave, and wherein the transmitter comprises:
- a second detector that detects a Received Signal Strength Indicator of a desiring signal wave sent from the receiver;
- an interfering wave power receiver that receives, from the receiver, the detected power of the interfering wave detected by the receiver;
- a transmission rate selection processor that, when the interfering wave power receiver receives the detected power of the interfering wave from the receiver, selects a transmission rate, which is used to transmit a signal from the transmitter to the receiver, from among a plurality of transmission rates based on the detected Received Signal Strength Indicator of the desiring signal wave and the detected power of the interfering wave; and
- a transmission rate controller that changes the transmission rate, which is used to transmit a signal from the transmitter to the receiver, to the transmission rate selected by the transmission rate selection processor.

15. A transmitter that transmits a signal to a receiver, the transmitter comprising:
- a detector that detects a Received Signal Strength indicator of a desiring signal wave sent from the receiver;
- an interfering wave power receiver that receives, from the receiver, the detected power of the interfering wave detected by the receiver;
- a transmission rate selection processor that, when the interfering wave power receiver receives the detected power of the interfering wave from the receiver, selects a transmission rate, which is used to transmit a signal from the transmitter to the receiver, from among a plurality of transmission rates based on the detected Received Signal Strength Indicator of the desiring signal wave and the detected power of the interfering wave; and
- a transmission rate controller that changes the transmission rate, which is used to transmit a signal from the transmitter to the receiver, to the transmission rate selected by the transmission rate selection processor.

16. A transmission rate control method executed in a transmitter that performs wireless communication with a receiver, the method comprising:
- detecting a Received Signal Strength Indicator of a desiring signal wave sent from the receiver;
- receiving, from the receiver, a detected power of interfering wave detected by the receiver;
- selecting a transmission rate, when the detected power of the interfering wave is received from the receiver, selecting a transmission rate, which is used to transmit a signal from the transmitter to the receiver, from among a plurality of transmission rates based on the detected Received Signal Strength Indicator of the desiring signal wave and the detected power of the interfering wave; and
- changing the transmission rate, which is used to transmit a signal from the transmitter to the receiver, to the selected transmission rate selected.

* * * * *